March 15, 1960     S. W. WILCOX     2,928,178
MECHANICAL PLOTTING AND MEASURING APPARATUS
Filed May 29, 1953     5 Sheets-Sheet 1
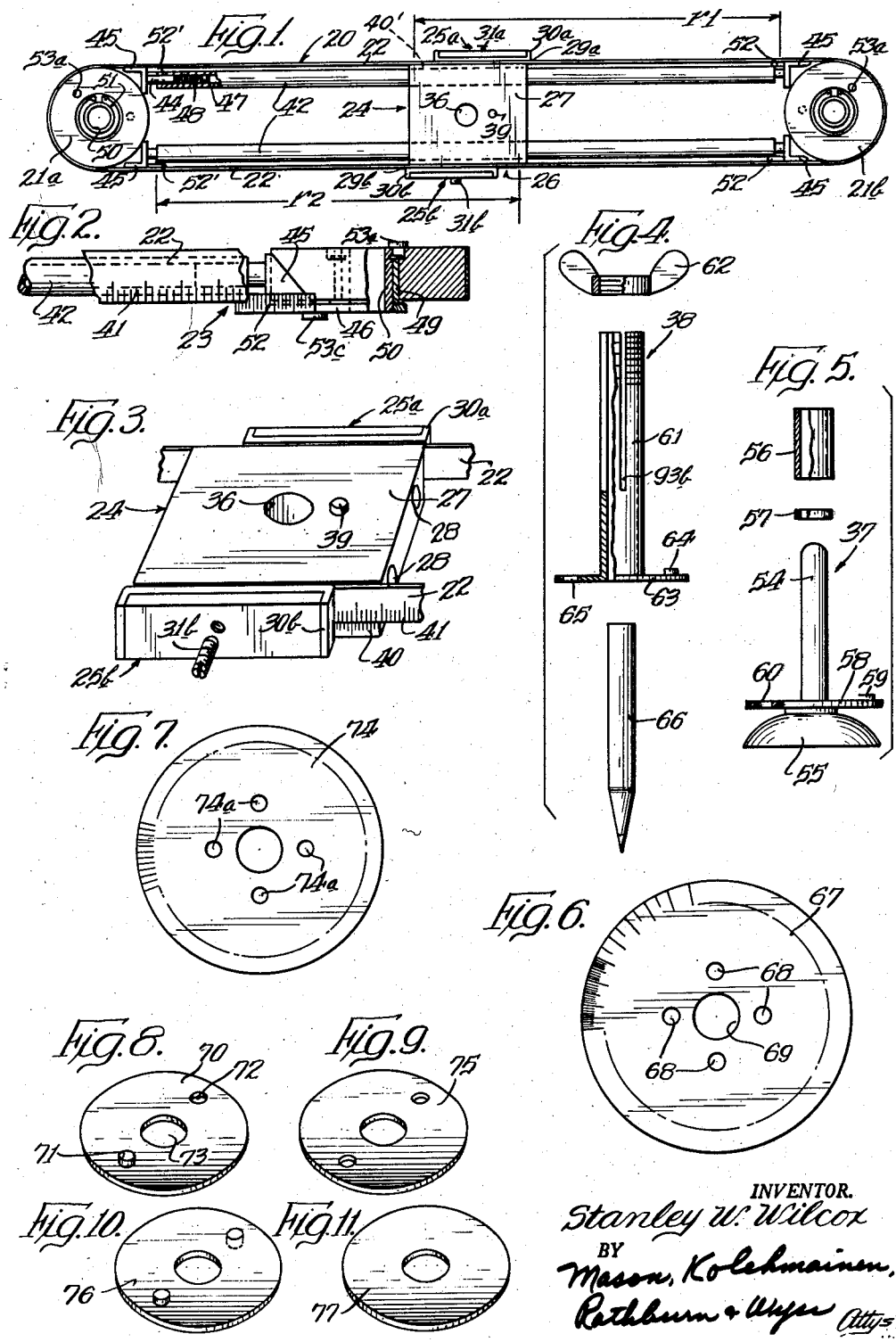
INVENTOR.
Stanley W. Wilcox March 15, 1960 S. W. WILCOX 2,928,178
MECHANICAL PLOTTING AND MEASURING APPARATUS
Filed May 29, 1953 5 Sheets-Sheet 2
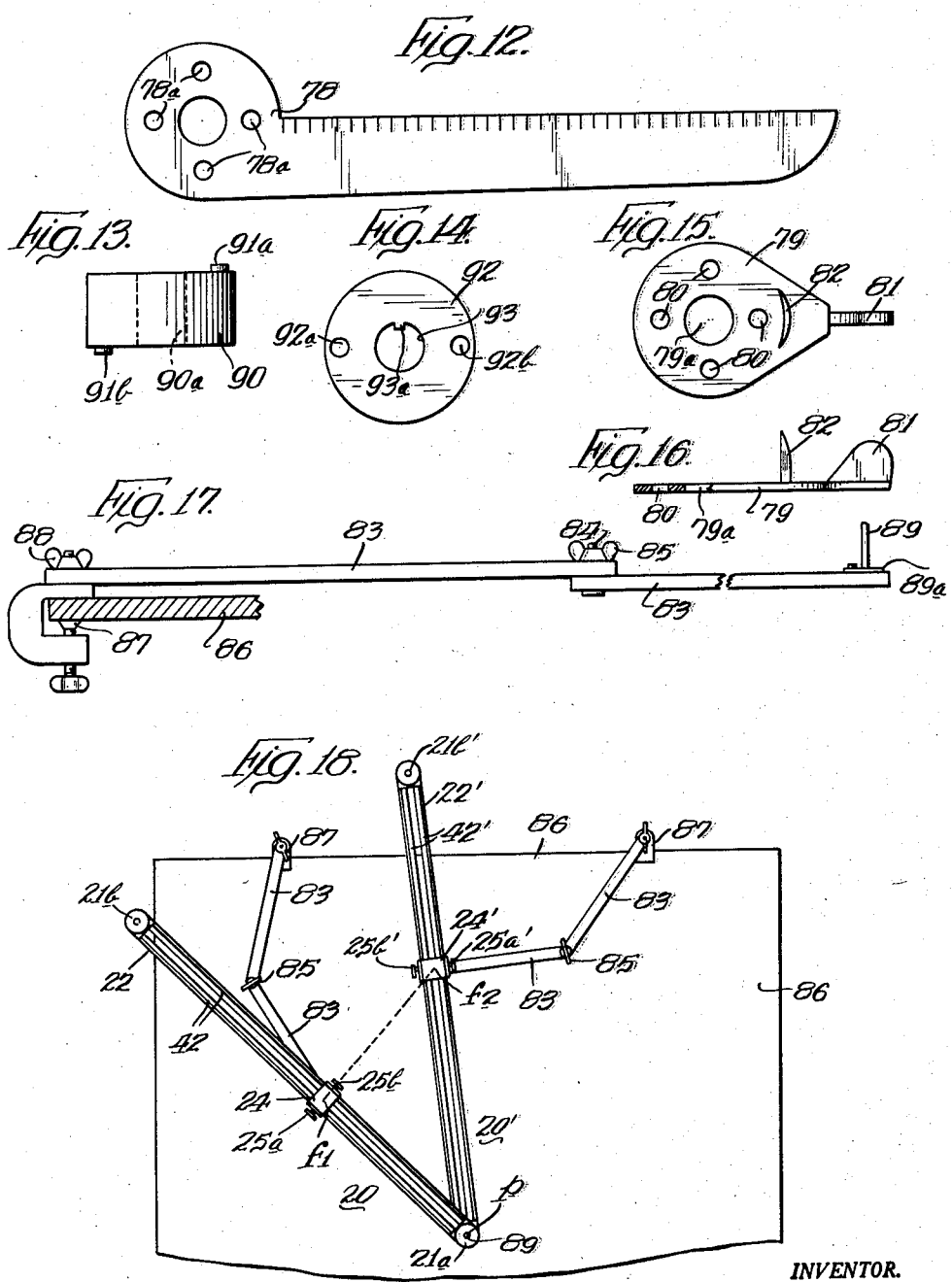
INVENTOR.
Stanley W. Wilcox
BY
Mason, Kolehmainen, Rathburn & Wyss
Attys.

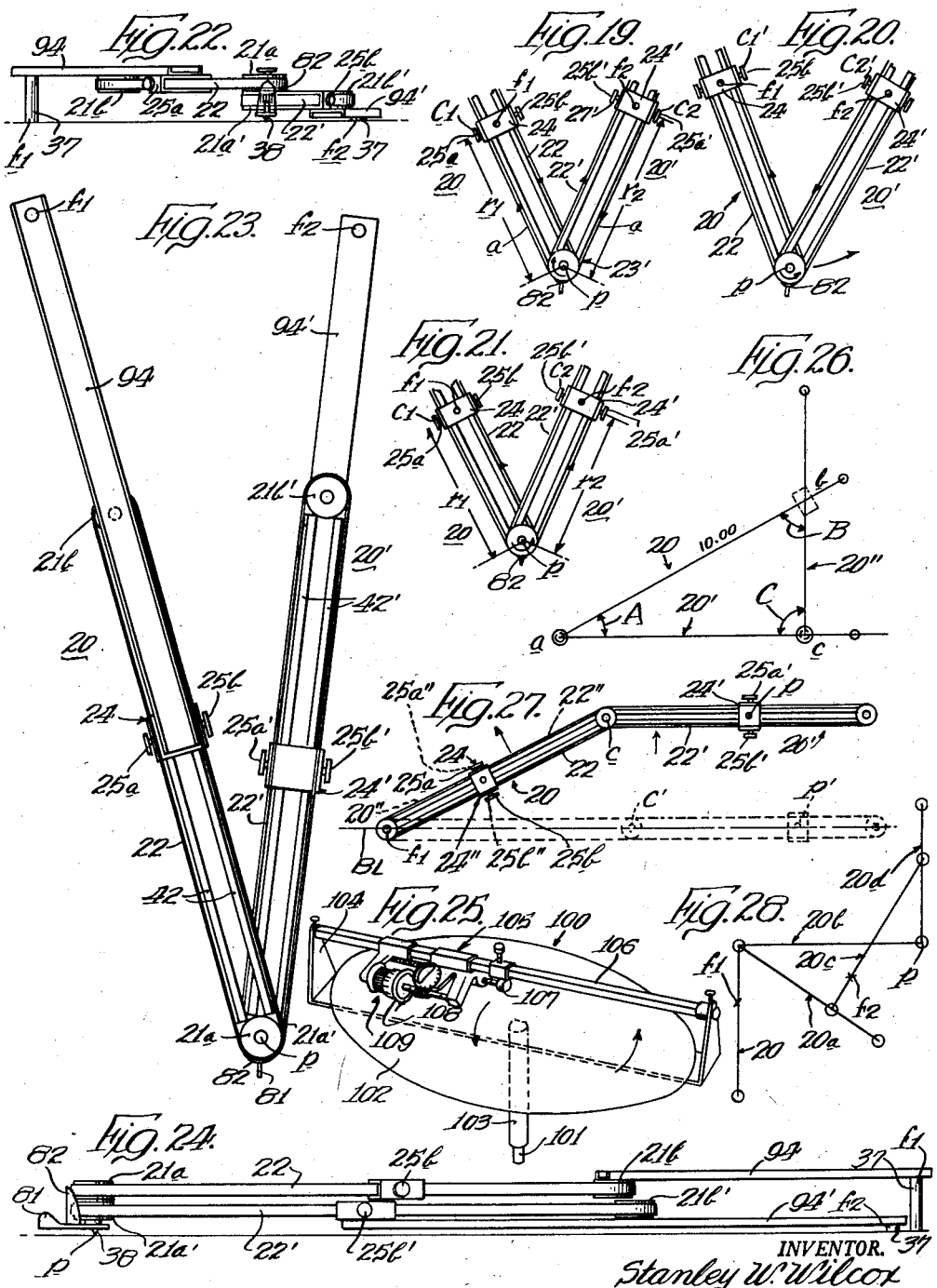

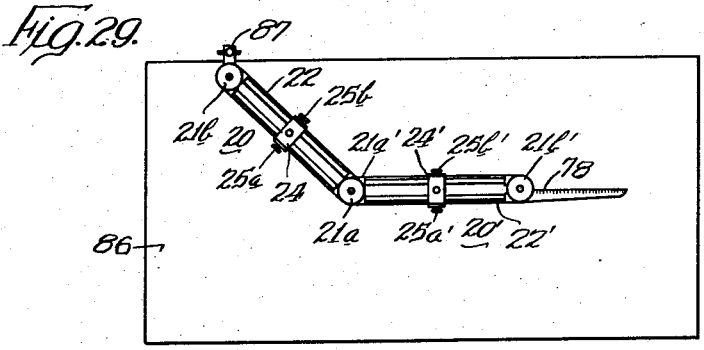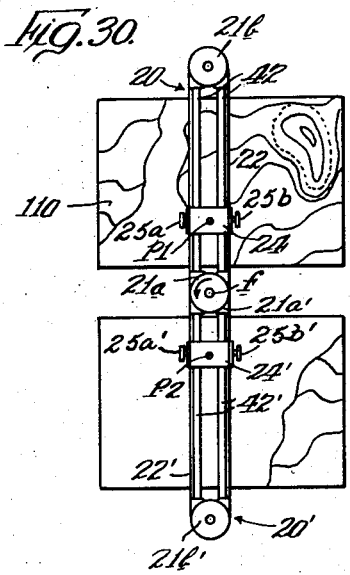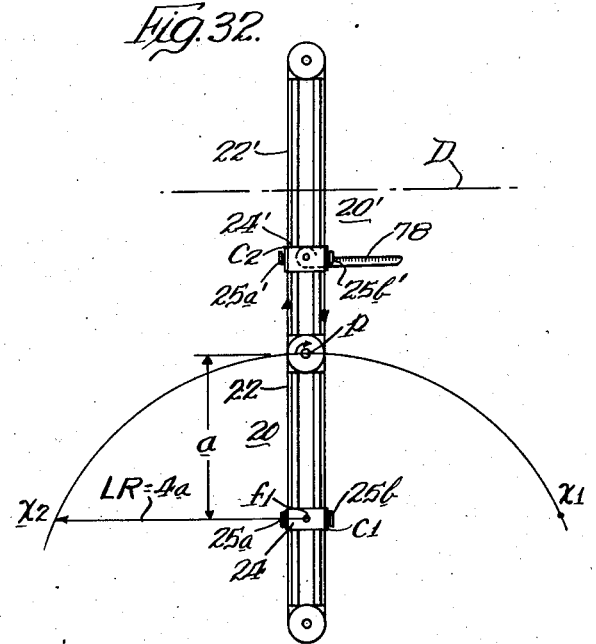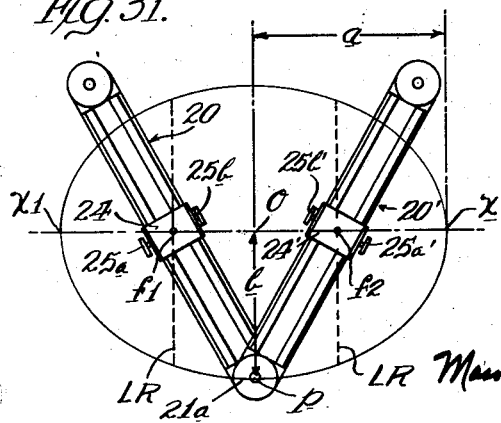

March 15, 1960 S. W. WILCOX 2,928,178
MECHANICAL PLOTTING AND MEASURING APPARATUS
Filed May 29, 1953 5 Sheets-Sheet 5
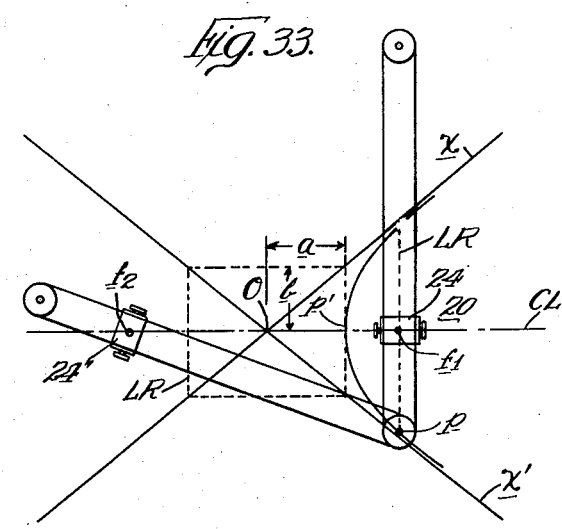
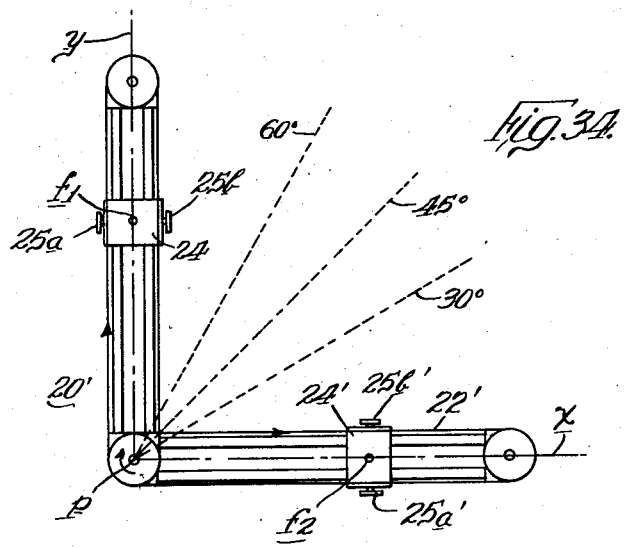
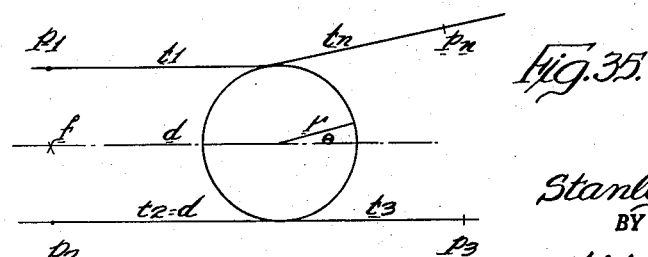
INVENTOR.
Stanley W. Wilcox
BY
Mason, Kolehmainen, Rathburn & Wyss
Attys.

United States Patent Office 2,928,178
Patented Mar. 15, 1960

2,928,178

MECHANICAL PLOTTING AND MEASURING APPARATUS

Stanley W. Wilcox, Tulsa, Okla., assignor to Seismograph Service Corporation, Tulsa, Okla., a corporation of Delaware Application May 29, 1953, Serial No. 358,228

56 Claims. (Cl. 33—27)

This invention relates to a mechanical plotting and measuring device and more particularly to a versatile combination of plotting units for producing a wide variety of geometric configurations and for solving a plurality of mathematical and geometric problems.

There are presently available separate devices for producing such geometric curves as hyperbolas and ellipses but in order to produce curves of a more complex nature, it is necessary at present to plot the curve in a point-by-point method from the mathematical equation either in the Cartesian coordinate system or the polar coordinate system. This method of curve production is a tedious and highly inaccurate one and is generally unsuitable. Even those instruments which are now employed for plotting ellipses and hyperbolas are somewhat limited in their use since generally these devices are adaptable for use with varying scale map coordinate plotting systems.

Although there are available at present such devices as polar planimeters which are capable of performing crude integrating functions, there is no simple differentiating device known to applicant which is capable of providing direct measurements of the differential of a portion of a curve. The present invention provides a solution to these and many other geometric problems by interconnecting a plurality of plotting units such as the one described in my copending application Serial No. 358,227, filed concurrently herewith and assigned to the same assignee as the present invention, in which the unique functions of the single unit set forth in that application are combined in a manner to enable the functions of each unit to supplement the functions of the interconnected units in order to accomplish a plurality of useful results.

It is therefore an object of the present invention to provide a single apparatus which is capable of producing a large variety of geometric configurations.

Another object is to provide a universal plotting device which is particularly adaptable for the production of conic section lines.

A further object is to provide a mechanical plotting device which is capable of making a large number of useful mathematical and geometric measurements.

A still further object is to provide a mechanical plotting and indicating device which will graphically solve a variety of mathematical equations.

Another object of the invention is to provide a plotting device for producing a family of hyperbolas.

Still another object is to provide a device for producing a series of hyperbolic curves and for measuring the family parameter and mathematical curve constants of the geometric configuration produced.

Another object of the invention is to provide a plotting device for the production of conic section lines in which direct indications of the family parameters are provided.

Still another object is to provide a plotting device for producing a family of elliptical curves.

Another object of the invention is to provide a plotting apparatus for tracing ellipses in which continuous measurements of the major and minor axes of the ellipse and the family curve constants are continuously provided.

A further object is to provide a plotting device for producing a family of parabolas.

Still another object is to provide a parabola producing apparatus which provides continuous measurements of the family parameter and the distance from the focus to any point on the parabolic curve.

Still another object is to provide a mechanical indicating device which is capable of differentiating a portion of a curve and providing a direct measurement of the differential obtained.

Another object is to provide a device of the character described in which a number of plotting units may be selectively interconnected at any of a plurality of positions to perform a wide variety of geometric and mathematical functions.

Still another object is to provide a device of the character described in which each of the interconnected units includes a sliding member, the movement of which may be controlled to enable the apparatus to produce curves of a predetermined configuration.

Another object of the invention is to provide a device of the character described in which the sliding members of each of the units may be adjusted to permit controlled movement of the slide on the unit or to permit free and unrelated movement of the slide.

A further object is to provide an apparatus of the character described in which each of the units includes an endless tape which passes through a sliding member and in which the sliding member may be selectively clamped to the tape to cause movement of the slide in a predetermined direction, clamped to the tape to lock the plotting unit and prevent movement in any direction, or unclamped to permit free and unrelated movement between the sliding member and the tape.

Another object is to provide an apparatus of the character just described in which means are provided for indicating the position along the tape at which the slide is clamped.

A further object is to provide a plotting device which includes means for indicating the angular and linear movement of all of the interconnected plotting units.

A still further object is to provide a plotting device which includes a pair of interconnected rotatable members having graduated scales thereon for measuring the rotation of the members and for measuring the differential rotation between the members.

Another object is to provide an apparatus of the type described in which detachable positioning means are provided to orient the plotter and in which marking means may be attached to the plotter to enable the production of preselected patterns.

Another object is to provide a hyperbola producing apparatus in which the positioning means may be located at the foci of the hyperbola and the effective length of the interconnected units may be simultaneously increased or decreased in order that the marking means may transcribe a hyperbola.

Still another object is to provide an elliptical curve tracer in which the positioning means are positioned at the foci of the ellipse and the effective length of the respective interconnected units are varied inversely.

Another object is to provide a parabolic curve plotter in which the effective length of the interconnected arm members are simultaneously increased or decreased at equal lengths.

In accordance with the present invention the foregoing and other objects are realized by a plurality of plotting units which may be interconnected at any one of a number of attaching positions in order to enable the units to accomplish a desired predetermined result. Each of the units consists of a pair of rotatable members over which is passed an endless tape having a graduated scale thereon which is in continuous registry with a fixed scale on the unit in order to provide an indication of the movement of the endless tape. The tape passes through a sliding assembly which is linearly movable along the unit between the rotatable members, and which is provided with a pair of clamping means which may be selectively actuated to enable the sliding assembly to move with the endless tape, to move freely with respect to the tape, or to lock the tape in position to prevent movement in any direction. The plotting units may be interconnected either by attaching the rotatable members together, by attaching the frame of the plotting units together, by attaching the wheel of one member to the sliding assembly of another member, or in any desired combination of these attaching positions.

By varying the manner in which the units are connected together and by varying the adjustable clamping means to control the movement of the separate sliding assemblies along their respective units, the interconnected plotters are rendered useful to accomplish a number of preselected functions. By utilizing two plotting units with a few basic attachments, the plotter is capable, for instance, of being connected as a conventional drafter, being connected to accurately produce a family of conic section lines, such as hyperbolas, ellipses and parabolas being connected to operate as a one to one pantograph, being connected to act as a differentiator, being connected to transcribe such known geometric curves as epicycloids and the like, and to serve as a plotting unit for use with radio positioning apparatus of the hyperbolic phase type such as that which is commercially known under the trademark "Lorac." By interconnecting three such units, the plotter is adaptable for such uses as the solution of a number of trigonometric problems such as simple triangulation, and the production of such known geometric curves as a cardioid, a catenary and a lemniscate of Bernoulli. The use of more than three such plotting units permits the construction of a scaled pantograph, permits three dimensional plotting and accomplishes a number of advanced trigonometric functions.

If the wheel assemblies of the plotting units are interconnected and provided with a means for reading the differential rotation of the joined wheels, the plotters are capable of differentiating curve sections. Since the movement of the endless tape over the rotatable members is measured, the further measurement of the rotation of the rotatable members together with the differential rotation provides useful information which will assist in the derivation of the mathematical equations which characterize the curve being traced. For instance, these measurements and indications when used with conic section curves enable a determination of the family parameter of the curve being studied and provide a direct measurement of the mathematical curve constants. Hence it can be seen that a versatile device is provided which will perform a number of functions which have heretofore either been incapable of solution by known mechanical means, or have required separate elaborate mechanical systems to enable their solution.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawings in which:

Fig. 1 is a plan view of a single mechanical plotting unit which is adapted to be interconnected with other identical units in a manner which characterizes the present invention;

Fig. 2 is an enlarged broken away portion of the plotting unit of Fig. 1 partly in section in order to show the details of the arbor assembly for mounting the rotatable members on the plotting unit;

Fig. 3 is a perspective of the sliding assembly of the plotter shown in position with the endless tape passing therethrough;

Fig. 4 is an exploded view of the marking means which are adapted to be attached to the unit of Fig. 1;

Fig. 5 shows an exploded view of the positioning means on which the plotter of Fig. 1 may be mounted;

Fig. 6 illustrates a protractor disc which may be attached to the rotatable members of the plotter of Fig. 1 to enable the measurement of the angular movement of the plotter;

Fig. 7 shows a vernier scale which registers with the protractor scale shown in Fig. 5 to facilitate the reading of the angle markings thereon;

Figs. 8-11, inclusive, illustrate a plurality of interconnecting washers which may be employed to interconnect the plotter of Fig. 1 with the attachments shown in Figs. 3 to 6 or with other plotting units;

Fig. 12 illustrates a linear straight edge attachment which may be connected to the plotter of Fig. 1;

Fig. 13 is an offset attachment which may be attached to the plotter of Fig. 1 in order to adjust the height of the plotting unit when several units are interconnected;

Fig. 14 shows a locking attachment for insertion on the wheel assembly of Fig. 1;

Fig. 15 is a plan view of a rotatable plate which may be connected to the wheel assembly of the plotter to facilitate the movement thereof;

Fig. 16 shows a front elevation view of the rotatable plate of Fig. 14;

Fig. 17 illustrates the connection of extender arms and positioning means to a conventional drafting board;

Fig. 18 shows a pair of interconnected plotting units assembled on a drafting board in a position for producing hyperbolas or ellipses;

Fig. 19 is a diagrammatic view of two interconnected plotting units showing one method in which the units may be moved to enable the device to be used in producing ellipses;

Fig. 20 diagrammatically illustrates an alternative adjustment of the plotting units of Fig. 18 to produce ellipses;

Fig. 21 diagrammatically illustrates the manner in which the plotting units may be connected to produce hyperbolas;

Fig. 22 shows an elevation view of a precision assembly of a pair of plotting units and the extender arms therefor when the device is connected to transcribe ellipses and hyperbolas;

Fig. 23 shows a plan view of the interconnected units and extender arms of Fig. 21;

Fig. 24 illustrates side view of the units of Fig. 22;

Fig. 25 shows a planimeter unit which may be connected to the wheel assemblies when the plotting units are used for position plotting in conjunction with a scaled map in order to make the rotation of the wheel assemblies correspond to the map scale;

Fig. 26 diagrammatically illustrates the interconnection of three plotting units for the solution of trigonometric triangulation problems;

Fig. 27 shows diagrammatically the interconnection of the plotting units to produce a cardioid;

Fig. 28 is a diagrammatic view of the interconnection of five plotting units to enable the device to produce a cardioid curve;

Fig. 29 shows the assembly of two plotting units and the linear straight edge when the plotters are connected as a conventional drafting instrument;

Fig. 30 shows the interconnection of two plotting units when the device is used as a simple one-to-one pantograph;

Fig. 31 illustrates the connection of two plotting units to enable the device to produce ellipses;

Fig. 32 shows the interconnection of two plotting units and the linear straight edge when the device is assembled to produce parabolas;

Fig. 33 shows the interconnection of two plotting units when the device is assembled to produce hyperbolas;

Fig. 34 illustrates the use of the plotter as a differentiator for a plurality of straight lines; and Fig. 35 is a diagrammatic illustration of the correlation between the mechanical structure of the plotter and the mathematical functions which it performs.

Referring now to the drawings wherein like reference characters designate like or corresponding parts throughout the several views, there is shown in Fig. 1 a single mechanical plotting unit which is adapted to be interconnected with other identical units in a manner which characterizes the present invention as described in more detail hereinafter. The single unit includes a frame or arm member 20 and a pair of rotatable assemblies or members 21a and 21b mounted on opposite ends of the frame and interconnected by a continuous flexible metallic tape 22 which is movable over the outer periphery of the rotatable members. An indicating scale designated as 23 and shown in Fig. 2 may be comprised of separate graduated scales positioned respectively on the metallic tape and the frame 20 in order to provide an indication of the travel of the tape over the rotatable assemblies.

Slidably positioned on the frame and linearly movable in a predetermined direction between the rotatable members 21a and 21b is a sliding assembly or cross member 24 through which the endless tape passes at two positions on opposite sides of the frame. The sliding assembly may be selectively clamped to the endless tape at either of these two positions and at any desired point along the length of the tape by means of a pair of clamping devices 25a and 25b positioned on the outer surfaces of the sliding assembly. When the sliding assembly is clamped to the tape at only one of the positions, movement of the endless tape 22, which is induced by rotation of either of the rotatable members, causes the sliding assembly to move along the frame 20 in a direction which is dependent upon the direction of rotation of the rotatable member and upon the particular clamping means which is actuated. An indicating means 26 which is comprised of cooperating scales positioned on the sliding assembly 24 and on the endless tape 22 provides an indication of the relative movement between the sliding assembly and the tape to enable the sliding assembly to be clamped at any desired and indicated position along the tape.

As best shown in Fig. 3 and described in detail in my aforementioned copending application Serial No. 358,227, the sliding assembly 24 includes a block 27 having a pair of longitudinal bores 28 therethrough for mounting the block on the frame 20. The endless tape 22 passes through a pair of longitudinal slots 29a and 29b on opposite sides of the block 27 in order that the clamping means 25a and 25b, which are also positioned in the longitudinal slots, may clamp the block 27 to the endless tape at either of the slotted positions. The clamping means 25a and 25b each include a brake shoe designated respectively as 30a and 30b and positioned respectively in the longitudinal slots 29a and 29b. Threaded lugs 31a and 31b which engage with internally threaded apertures 32a and 32b, respectively, in the portion of the block forming the longitudinal slots 29a and 29b cooperate with the brake shoes to enable the block to be clamped to the tape. A small indentation 35 in the surface of the brake shoe accommodates a rounded end of the threaded lug in order to aid in the application of locking pressure to the endless tape 22 and to prevent the withdrawal of the brake shoe from the tape unless the lug has first been removed. Insertion of one of the lugs into the threaded aperture forces the brake shoe into contact with the metallic tape 22 and thereby clamps the sliding assembly to the tape whereby rotation of one of the rotatable members 21a or 21b causes movement of the sliding assembly 24 along the frame 20 in a predetermined direction. For instance, let it be assumed that it is desired to move the sliding assembly from the position shown in Fig. 1 to the right towards the rotatable assembly 21b when the rotatable assembly is rotated in a clockwise direction as viewed in Fig. 1. The clamping means 25a is actuated by tightening the lug 31a until the brake shoe 30a clamps the sliding assembly to the endless tape as the tape passes through the longitudinal slot 29a. Rotation of the assembly 21b in a clockwise direction moves the endless tape thereover and the movement of the endless tape in turn induces linear movement of the sliding assembly along the frame 20 towards the rotatable assembly 21b. It is manifest that rotation of the rotatable assembly 21b in a counterclockwise direction with the sliding assembly clamped at the position indicated causes the sliding assembly to move to the left as viewed in Fig. 1, toward the rotatable assembly 21a. This reverse movement of the sliding assembly, that is, movement toward the assembly 21a may also be effected by clamping the block 27 to the metallic tape by means of the clamping means 25b after first releasing the locking pressure of the clamping means 25a on the tape. With the tape clamped in this manner, that is, with the clamping means 25b actuated, rotation of the rotatable member 21a in a clockwise direction as viewed in Fig. 1 causes the endless tape to move the sliding assembly along the frame towards the rotatable assembly 21a. Hence, it can be seen that movement of the sliding assembly 24 upon rotation of either of the rotatable members 21a or 21b may be selectively effected in either of two predetermined directions along the frame 20 by proper manipulation of the clamping means 25a and 25b. Simultaneous application of pressure through the clamping means 25a and the clamping means 25b locks the sliding assembly to the tape at two positions on opposite sides of the frame so that movement of the tape over the rotatable members is thereby prohibited. On the other hand, if neither of the clamping means is actuated, free and unrelated movement between the tape and the sliding assembly may be effected. From the foregoing description it can be seen that by selective adjustment of the clamping means, the sliding assembly may be moved along the frame in either of two preselected directions in accordance with the movement of the endless tape, may be moved along the frame in either of two preselected directions in accordance with the movement of the endless tape, may be moved along the frame irrespective of the movement of the tape, or may be locked to the tape simultaneously at two positions to prohibit movement of both the tape and the rotatable assembly.

To enable the sliding assembly to cooperate with the endless tape and rotatable members in producing geometric configurations, a transverse opening 36 may be provided in the block 27 for receiving an attachment 37, shown in Fig. 4, for positioning the mechanical plotter with respect to a drafting board or the like, or for receiving a marking attachment 38, shown in Fig. 5, in a manner to be subsequently described in detail. A suitable attaching means in the form of a projecting pin 39 may be provided on the upper surface of the block 27 in order to register with openings in a washer, another mechanical plotting device, or other suitable attachments in a manner which will become fully evident as the description proceeds.

The indicating means 26 comprises vernier scales 40 and 40' secured on opposite sides of the block 27 in registry with a graduated scale 41 on the tape 22, and these scales are so arranged that the scale reading is representative of the position of the center of the opening 36 in the block with respect to the metallic tape. The scales 40 and 40' are offset by a predetermined distance from the center of the opening 36 but cooperate with the scale 41 in a manner to be subsequently described in detail in order that the sliding assembly 24 may be accurately located along the tape by reference to the indicating means. It now becomes apparent that the clamping means 25a and 25b may be utilized to lock the sliding assembly to the tape at any accurately measured position as indicated on the scale 26.

As shown in Fig. 1, it is apparent that the frame 20 includes a pair of parallel spreader rods 42 at each end of which is positioned an arbor assembly 43 for rotatably mounting the wheel assemblies 21a and 21b on the frame. The spreader rods 42 are in the form of tubes, each end of which telescopes over a stud 44 which is secured to a bracket 45 on a segmental end plate 46 of the arbor assembly. Threadedly inserted into an internally threaded end portion of each of the spreader rods is an adjusting plug 47 which may be inserted to any desired depth in the internally threaded end portion of the rod in order to adjust the pressure on a compression spring 48 positioned within the end of the rod between one end of the stud 44 and the head of the plug 47. Tension on the tape 22 may be adjusted by varying the pressure of the springs 48 on each of the arbor assemblies 43, which variation is accomplished by altering the depth of the adjusting plug 47 in the spreader rod. Application of manual pressure to either of the arbor assemblies moves the studs 44 within the spreader rods, compresses the spring 48, relieves the tension on the tape 22 and permits the tape to be slipped off of the wheels 21a or 21b to enable assembly or disassembly of the plotting unit. In order to adjust the position of the adjusting plug within the threaded end portion of the spreader rod 42, it is apparent that the unit must be disassembled by slipping the tape off of the rotatable assemblies 21a and 21b in the manner just described and removing the stud members 44 and the spring 48 from the end of the rod so that an adjusting tool may be inserted therein. In this manner uniform tension may be maintained on the tape to compensate for variations in temperature and for wear on the moving parts of the plotting unit.

Referring now to Fig. 3 for a description of the component parts which constitute each of the rotatable assemblies, it can be seen that a thimble journal 50, which is in the form of a hollow cylinder, is mounted on the end plate 46 and encompassed by an anti-friction sleeve bearing 49 about which one of the rotatable wheels may be rotated. To maintain the bearing sleeve in position and to hold the wheel on the journal 50, an annular snap ring 51 may be provided in abutment with the sleeve 49 and encircling the cylindrical journal 50. If a precision instrument is desired, preloaded anti-friction ball bearing assemblies may be substituted for the hollow sleeve bearing 49 in order to increase the accuracy of the device and reduce friction.

The indicating means 23 as shown in Fig. 2 comprises vernier scales 52 and 52' secured to the brackets 45 of the wheel assemblies 21a and 21b so as to register with the graduated scale 41 on the endless tape 42. The vernier scales 52' and 52 are offset from the center of the wheel assemblies 21a and 21b, respectively, by a distance which corresponds to the zero-point offset distance of the scales 40 and 40' attached to the sliding assembly 24. The tape 22 may be set to zero by moving the tape with the clamps 25a and 25b released until tape zero registers with the zero point on the vernier scales 40 and 40' and the offset of these scales and of the scales 52 and 52' enables a direct reading of the tape distance between scales 40' and 52' and 40 and 52 which is indicative of the distance between wheel assembly centers and the center of the sliding assembly. As shown in Fig. 1, a reading of the tape measurement differences at the vernier scale 40' and the scale 52 indicates the distance $r_1$ whereas the tape measurements between vernier scale 40 and scale 52' measures the distance $r_2$. By actuating one of the clamping means 25a or 25b one of the vernier scales 40 or 40' is clamped in fixed position with respect to the tape 22 while the reading on the unclamped vernier scales indicates an apparent movement of the tape which is twice the distance of movement of the sliding assembly along the frame. The double distance indication is induced by the movement of the sliding assembly in one direction along the frame and the simultaneous movement of the tape in an opposite direction through the sliding assembly. The actual tape movement is therefore one-half of the scale reading at the vernier and the values of $r_1$ and $r_2$ may consequently be ascertained with twice the accuracy of conventional direct indicating vernier scales. The purpose of the setting up of the mechanical plotter in this manner is to establish a relationship between the transverse movement of the slider and the rotational motion of the wheel assemblies and to display quantitatively these movements.

If the tape is set to zero by application of manual pressure to the rotatable assembly 21b and movement of the tape until the zero point of the graduated scale 41 registers with the zero point of the vernier scale 52 or 52', it becomes apparent that rotation of either of the wheel assemblies moves the endless tape with respect to the fixedly mounted scale 52 and that the amount of tape movement is consequently measured directly by a comparison of the graduated scale 41 with the fixed scale 52. In this manner precise indicating means is available for accurately positioning the tape 22 with respect to the wheel assembly and the frame and for indicating directly the magnitude of the movement of the tape over the wheels.

To facilitate the assembly and disassembly of the mechanical plotter with other identical plotting units and with its attaching members, suitable attaching means such as assembly pins 53a may be provided on the upper surfaces of the wheels. The pins 53a are identical in size and shape to the pin 39 on the sliding assembly 24 and, like pin 39, register with suitable apertures in assembly apparatus which is secured to the single plotting unit as described in detail hereinafter.

In order to provide a means for attaching the frame 20 to other assembly apparatus, the bottom surface of the supporting plate 46 may be provided with attaching means in the form of a downwardly protruding pin 53c identical in size and shape to the pin 39 on the sliding assembly and the pins 53a on the upper surface of the wheels.

The inner diameter of the hollow cylindrical journal 50 is equal to the diameter of the opening 36 in the sliding assembly so that the attachments 37 and 38 may be interchangeably inserted into these openings. More specifically, the positioning attachment 37 may be inserted into the opening 36 in the sliding assembly and simultaneously therewith the marking attachment 38 may be inserted into the journal 50 at either of the wheel assemblies. Movement of the sliding assembly along the frame induces predetermined relative movement between the fixed positioning attachment and the movable marking means so that a desired pattern may be transcribed. If desired, the positions of the attachments 37 and 38 may be interchanged, that is, the attachment 37 may be secured to one of the wheel assemblies while the attachment 38 is secured to the slide, with a resulting change in the direction of the relative movement therebetween. The central opening in the journal 50 may also be used for the insertion of a cross hair or alignment scope (not shown) or for the insertion of pin point centering device in order to orient accurately the center of the opening over a fixed point.

The attachment 37 includes an upright stub 54 to which is secured a suction cup 55 or other suitable positioning means which may be selectively attached at any desired position on a drafting board, a drawing paper, a map, or the like. The positioning stub may be selectively inserted into either the opening 36 in the sliding assembly or the central opening in the journal 50 in order to accurately orient the plotter with respect to any fixed position. Spacer sleeves 56 and 57 may be utilized to adjust the height of the plotter if such is required or to space the positioning attachment with respect to other attachments which are assembled on the stub 54. Although only one of each of the spacers 56 and 57 is shown in Fig. 4, it is to be understood that a plurality of each of these members are provided so that a sufficient number of spacers are available to assemble the plotter in any desired manner. Also it should be understood that a number of positioning members are actually provided having stubs 54 of varying length to permit the assembly of a selected number of plotting units or other attachments on each of the stubs. The stub 54 may be provided with a washer 58 having an assembly pin 59 and an assembly aperture 60 for registering with a corresponding aperture or pin on apparatus to which the positioning attachment 37 is secured. The pin 59 is identical in size and shape to the pin 39 on the sliding assembly, to the pins 53a on the upper surface of the wheels and to the pin 53c on the frame. The aperture 60 is adapted to accommodate one of the pins 39, 53a or 53c when the positioning attachment is secured to the sliding assembly, to the rotatable assembly or to the frame of the plotting unit.

For many purposes a positioning attachment of the type just described is not feasible and hence a different means for establishing a fixed point is desirable. For this reason, a point establishing means of the type shown in Fig. 17 may be substituted for the attachment 37 and, consequently, it will be understood that further reference to the positioner 37 includes both of these general types. The positioner of Fig. 17 includes a pair of positioning arms 83 pivoted about a junction bolt 84 to which locking pressure may be applied by the wing lock nut 85 to lock the arms in position. The arms may be secured to a drafting board 86 or the like by means of a clamp 87 about which the arms are pivoted. A lock nut 88 may be provided to lock one of the positioning arms to the clamp thereby positioning the arms on the drafting board to the clamp. On the outer extremity of the positioning arm is preferably mounted a screw-in positioning pin 89 which corresponds in function to the stub 54 of the positioning attachment 37 and which may be attached directly to the clamp 87 in the event that the positioning arms are not necessary to fix the position of the pin 89. The positioning pin may be provided with an attaching washer 89a which is identical to the washer 58 on the positioning attachment 37 and which has a positioning pin adapted for registry with suitable attaching apertures and an aperture for accommodating attaching pins when the plotter is assembled on the pin 89.

As shown in Fig. 4, the marking attachment 38 includes a sleeve assembly bolt 61 which is selectively insertable either into the opening 36 in the sliding assembly or into the central opening in the thimble journal 50 and which is retainable therein by a wing nut 62 threadedly attached to the upper end of the bolt. A washer 63 may be secured to the lower end of the bolt 61 in order that an assembly pin 64 and an assembly aperture 65 of the washer may register with an accommodating aperture or pin in the apparatus to which the bolt is attached. A marker 66, which may be a marking pen or pencil as shown in Fig. 4 or may be a scriber or other suitable marking means, is insertable into the hollow of the sleeve assembly bolt 61 so that the marker may be positioned either on the sliding assembly 24 or on one of the wheel assemblies 21a or 21b. Although only one sleeve bolt 61 is shown in Fig. 4, actually a plurality of such bolts of varying length are provided to facilitate the assembly of the apparatus and to accommodate a varying number of attachments which may be inserted over the bolt 61.

A protractor circle disc 67 of the type shown in Fig. 6, one side of which is provided with peripheral graduations calibrated in degrees and the other side of which is provided with peripheral graduations corresponding to the linear calibrations 41 on the endless tape 42, may be secured to the wheel assembly 21 with either of these two sides showing to provide desired indications. In assembling the wheel and protractor disc an assembly aperture 68, a plurality of which are formed in the disc at spaced intervals, may be placed in registry with one of the assembly pins on the apparatus to which the disc is attached, such as the pin 59 on the washer 58 or, as is more common, on the pin 53a of the wheel assembly. A central opening 69 in the protractor disc fits over one of the attachments 37 or 38 so that the protractor disc may be fixed with respect to the attachment while the wheel 21a or 21b is free to rotate. If desired, the disc 67 may be made rotatable with the wheel by utilizing a washer 70 of the type shown in Fig. 8 in which a pin 71 on the washer inserts within one of the apertures 68 in the disc and simultaneously therewith aperture 72 in the washer receives one of the pins 53a on the wheel. A central opening 73 in the washer receives either of the attachments 37 or 38, when the disc is locked to the wheel assembly by engagement of the pins and apertures so that rotation of the wheel induces rotation of the disc through the interlocked pins and apertures.

A vernier plate 74, one side of which is provided with a vernier scale graduated in degrees to correspond to the scale on one side of the disc 67 and the other side of which is graduated in linear divisions to match the linear scale on the other side of the disc 67, may be attached to the wheel assembly by means of the assembly apertures 74a in a manner identical to the assembly of the disc 67.

By proper selection of the washers shown in Figs. 8 to 11, in order to register the necessary pins and apertures in a manner similar to the assembly of the disc 67, the vernier plate 74 may be non-rotatably assembled on the arbor assembly 43 or may be mounted on the wheel assembly to rotate therewith. A washer 75 illustrated in Fig. 9 and having two apertures therein is provided for simultaneous registry with two separate pins, in order that the washer is rendered useful in locking together two surfaces having protruding assembly pins, such as the washer 58 and the wheel assembly 21a or 21b.

A washer 76 of the type shown in Fig. 10 is provided with two protruding pins for simultaneously registering with two apertures in order to lock together attachments which are provided with the apertures. Such a washer may be useful in interconnecting the protractor disc and the aperture 72 in washer 70 or for other similar purposes.

A washer 77 of oilite or prelubricated metal construction as illustrated in Fig. 11 is used between the abutting surfaces of freely movable fixtures whenever free movement is desired. Actually, several of each of these types of washers are provided since more than one washer of a particular type may be required in one assembly.

The washers illustrated are merely one acceptable means for providing free movement or fixed movement between the plotting unit and the attachments mounted thereon. The pins and holes may be tapered to take up play between adjacent washers and increase the accuracy of the plotter. An alternative means for providing the fixed or free movement between assembled parts of the apparatus could be achieved by employing male and female washers having interlocking gear teeth.

From the above it now becomes apparent that the attachments 37 or 38 may be connected to the sliding assembly 24 or to either of the rotatable assemblies 21a or 21b of the plotting unit and further that these attachments may be mounted so as to be freely rotatable with respect to the part to which it is attached or so as to be locked to the component element to which it is attached by selective interconnection of the pins and apertures. More specifically, the attachment 37 may be inserted within the central opening in the journal 50 to permit the plotter to be rotated about a fixed point as established by the section member 55. In order to permit the free rotation of the plotting member, it is necessary that the protruding pins 59 on the washer and 53c on the frame member be compensated for by suitable washers so that these pins do not interfere with the rotation of the unit. To this end a washer 70 may be placed on the positioning stub 54 so that the pin 71 inserts within the aperture 60 and at the same time the aperture 72 accommodates the pin 59. Simultaneously therewith a washer 75 may be placed on the stub 54 so that one of the apertures therein registers with the pin 53c on the frame whereby the flat surfaces of the washers are in abutment. It now becomes apparent that the plotting unit is rotatable about the stub since the attaching pins 53c and 59 are not interconnected and the flat surfaces of the washers facilitate free rotation. In similar manner, the frame of the plotter may be fixedly mounted with respect to the positioning member 37 by placing a washer 75 on the stub 54 so that one of its apertures registers with the attaching pin 59 and the other of its apertures registers with the pin 53c on the frame. In this manner the pins on the frame and the positioning member are interconnected by the washer 75 and the frame 20 cannot be rotated about the fixed positioning member.

Let it now be assumed that it is desired to secure the sliding assembly 24 to the positioning attachment 37 so that the sliding assembly is non-rotatable thereon. A washer 75 is placed on the stub 54 so that one of its apertures accommodates the pin 59 and the other of its apertures accommodates the pin 39 when the sliding assembly is inserted over the stub by means of the opening 36. Since the pins 39 and 59 are interconnected by the washer 75, the sliding assembly is fixedly positioned on the positioning attachment and rotation therebetween is prohibited. To permit rotation of the sliding assembly about the attachment, a washer 70 is placed on the stub so that the pin 71 registers with the aperture 60 and the aperture 72 receives the pin 59 thereby presenting a flat surface to the sliding assembly. A washer 75 may be next be placed on the stub so that one of its apertures will accommodate the pin 39 on the sliding assembly and the two abutting flat surfaces of the washers will permit free rotation of the plotter and the sliding assembly about the positioning attachment. In similar manner either of the wheel assemblies 21a or 21b may be selectively interconnected with the positioning attachment to permit free rotation thereon or to interlock the rotatable assembly and the washer 58 on the positioning attachment to prevent such rotation.

A straight edge 78 having assembly apertures 78a as shown in Fig. 12 may be attached to one of the wheel assemblies 21a or 21b or to the sliding assembly and by proper selection of washers, the straight edge selectively may be rendered rotatable with the wheel assembly, may be mounted fixedly on the arbor assembly, or may be rotatable freely with respect to both the wheel assembly and the arbor assembly. When the straight edge is attached to the sliding assembly proper selection of washers enables the straight edge to be mounted for rotation about the sliding assembly or to be fixedly mounted at a predetermined position thereon. When the straight edge is used with the plotter, the vernier plate 74 and the protractor disc 67 may also be assembled on the wheel assembly so that the angular rotation of the straight edge about the thimble journal 50 may be exhibited accurately on the protractor disc 67 in cooperation with the vernier scale. It is apparent that this indication may be provided either by fixedly mounting the vernier plate on the arbor assembly and mounting the protractor disc for rotation with the straight edge or by fixedly mounting the protractor disc and mounting the vernier plate for rotation with the straight edge. The fixedly mounted scale, either on the vernier plate or the protractor disc, provides a fixed starting point from which angular rotation between the disc and the plate may be read by reference to the peripheral indicator scale on the protractor disc. The straight edge may initially be set to any desired angle by reading the indicator scale and orienting the straight edge therewith at the indicated position on the wheel assembly so that any angular movement is displayed on the protractor disc.

To facilitate the rotation of the assembled plotting unit, a rotating plate attachment 79 may be provided having a central opening 79a which is insertable over the positioning stub 54 or the sleeve bolt 61 in order to mount the plate with respect to either of the wheel assemblies. Assembly apertures 80 are provided in the plate for engagement with suitably shaped pins in the manner heretofore described so as to enable the plate to be assembled with these apertures in engagement with suitable pins on the assembly apparatus to which the plate 79 is attached. In order to maintain inertia torque and restraint stresses at a minimum, the tracer of the units should be moved in the anticipated direction of the curve to be transcribed. To facilitate the operation of the plotter the plate 79 may be provided with a finger grip 81 at its outer extremity to permit the facile rotation of the plotter by hand when the plate 79 is mounted on the tracing axle of the sleeve bolt 61 thereby providing free rotation of the plate 79 and assuring that the force applied to the finger grip is approximately tangential to the curve to be produced. A vernier scale 82 may be carried by the plate 79 to aid in reading the dial settings of the scale with which it is in registry. The scale 82 is actually a transparent shield which may overlie and register with the graduations on the endless tapes passing over two or more joined wheel assemblies. The scale 82 may be aligned with any convenient marker on the tapes and after movement of the tapes over the wheels, the final reading of the two graduated scales is indicative of the differential tape movement. Since the plate 79 is freely rotatable, its movement after the initial tape readings have been recorded will not alter the final reading of differential movement. This scale is also adaptable for simultaneous registry with protractor scales mounted on separate wheel assemblies when two of the plotting units are interconnected so that a direct indication is provided of the relative angular rotation between the wheel assemblies on the separate plotters. The measurement of this relative rotation is important in determining the curve constants of a number of geometric curves which the plotter is capable of producing and may also be indicative of the differential of a small portion of any geometric curve as will be described more fully hereinafter.

For the purpose of providing vertical offset to adjust the height of the plotting units when several of the units are interconnected in a manner to be subsequently described in detail, there is provided a spacer block 90 the thickness of which is equivalent to the thickness of one of the wheel assemblies 21a or 21b in order that the block 90 may replace one of the units in an assembly. A central opening 90a in the block 90, which is equal in diameter to the central opening in the cylindrical journal 50, enables the attachments 37 and 38 or other attachments adapted to be connected to the units, to be mounted on the spacer block 90 in the same manner as the attachment to the wheel assemblies previously described. In order that the block 90 may replace one of the plotting units so as to be selectively interconnected with these attachments, locking pins 91a and 91b positioned respectively on the upper and lower surfaces of the block are adapted to mesh with the locking apertures of the attachment devices. By proper selection of attaching washers, the spacer block 90 may be rendered operative in exactly the same manner as the wheel assemblies 21a or 21b whereby the block may be adapted for free movement about the attachment or the unit on which it is mounted or for fixed movement therewith.

To transmit the rotary movement of the wheel assemblies 21a or 21b to other units which may be attached to the wheel assemblies, such as to a planimeter 100 shown in Fig. 25 and described in detail hereinafter, there is provided a rotation transmitting washer 92 which is adapted to be secured to the wheel assemblies, the block 90 or to the attachments mounted on the plotting unit in a manner which corresponds to the interconnection of the other attaching washers of the plotter. More specifically, the transmitting washer 92 includes an attaching aperture 92a and an attaching pin 92b which are adapted to mesh with corresponding pins and apertures on the equipment with which the washer 92 is placed in contact. A central opening 93 in the transmitting washer 92 is of equal diameter with the opening 90a in the spacer block 90 and may be provided with an internally protruding key 93a which is adapted to interlock with suitable keyway slots in the attaching units which are mounted on the plotter. For instance, the key 93a may mesh with a suitable keyway slot on the rotary shafts of the planimeter 100 in order to impart the rotary movement of the wheel assemblies 21a or 21b to the operating mechanism of the planimeter. In similar manner the rotary movement of the wheel assemblies may be imparted to other attachments whenever it is desirable to transmit this rotary movement to such mechanisms.

As indicated above, the plotting unit 20 previously described is adapted to be connected to or associated with other similar units to accomplish a number of different functions, many of which are described in the ensuing portions of this specification. In the following description therefore, the first such additional unit has been assigned reference numeral 20' and the individual component elements of the additional unit have been given primed reference numerals corresponding to identical elements of the unit 20. Thus, for example, the slide of the additional unit has been designated as 24' and so on. In similar manner when a third unit is used, it has been identified as 20'' and its elements bear double primed reference numerals corresponding to identical elements of the unit 20.

One of the principal uses for the plotting device of the present invention is to produce conic section lines of predetermined contour and preselected magnitude. These conic section lines are defined as the locus of a point whose distance from a fixed point, designated as a focus, is in a constant ratio, which ratio is called the eccentricity, to its distance from a fixed straight line, called a directrix. Principally these conic section lines are of three types, namely parabolas, ellipses and hyperbolas, those conic section lines having an eccentricity equal to 1 resulting in a parabola, those having an eccentricity greater than 1 producing a hyperbola and those having an eccentricity less than 1 forming an ellipse. In order to produce conic section lines by utilizing the plotter of the present invention, it is necessary to employ two of the plotting units which are interconnected so that the rotary movement of the wheel assemblies imparts a predetermined linear movement to the sliding assemblies and induces the tracer to follow the prescribed pattern. More specifically, to produce conic section lines it is desirable that wheel assemblies on the individual plotting units be interconnected and that the marking attachment 38 or the like be secured to the joined wheel assemblies. Fixed position is established at the foci of the conic section lines by employing the positioning attachment 37 or the positioning pin 89 to properly orient the interconnected units with respect to the foci. The sliding assemblies of the individual units are secured to the positioning means at the foci and the sliding assemblies are clamped at preselected positions to the endless tapes thereby providing a constrained mechanical system in which the tracing point must move in a predetermined path upon movement of the joined rotatable assemblies. By proper actuation of the clamping means 25a or 25b on the plotting units, the constrained tracer will produce parabolic lines, hyperbolic curves or ellipses as desired. The indicating means 23 and 26 in cooperation with the protractor disc 67, the vernier disc 74 and the upright vernier plate 82 provide indications which enable a determination of the curve constants of the curves generated as well as the family parameters of these curves.

For a better understanding of the use of the plotters of the present invention in plotting ellipses, reference may be had to Figs. 19 and 20 in which broken away portions of plotting units 20 and 20' are shown having their wheel assemblies interconnected and having their sliding assemblies 24 and 24' positioned respectively at the focal points of the ellipse. Referring particularly to Fig. 19, the sliding assemblies 24 and 24' are positioned respectively at the foci $f_1$ and $f_2$ with the wheel assemblies of the plotting units mounted on a common shaft for rotation together at the point $p$. The marking attachment 38 is mounted on the joined wheel assemblies also at the point $p$ so that when the endless tapes 22 and 22' of the separate units are clamped at their outside points $c_1$ and $c_2$, respectively, the marker at the point $p$ will be constrained to follow the contour of an ellipse. The effect of interconnecting the plotting units in this manner may be appreciated by considering that the clamping of the endless tapes at the two outside positions in effect interconnects the two focal points by a single tape which passes from the clamp $c_1$ around the wheel at the point $p$ and then to clamp $c_2$ as designated by the letter "$a$" on the outside portion of the endless tape. Therefore the connected units will perform in a manner which is analogous to a plotting system having a marker which is constrained by a string of predetermined length, the ends of which are positioned at the focal points of an ellipse. An elementary knowledge of plane geometry dictates that the resultant movement of such a constrained system causes the marking means to follow an elliptical pattern in which the sum of the lengths of the string from the marker positioned at any point on the curve to each of the focal points is a constant. In other words, the general condition under which an ellipse will be generated is fulfilled when the equation:

$$r_1 + r_2 = k \text{ (a constant)}$$

is satisfied. In this equation the quantity $r_1$ represents the distance from focal point $f_1$ to any point on the curve and the quantity $r_2$ represents the distance from the same point to the focal point $f_2$. A consideration of Fig. 19 reveals that the distance from $f_1$ to the point $p$ is equivalent to the term $r_1$ and that the distance from $f_2$ to the point $p$ represents the quantity $r_2$. Since the tapes are clamped at $c_1$ and $c_2$ it is manifest that the sum of the quantities $r_1$ and $r_2$ is a constant. As the point $p$ moves due to a rotation of the commonly mounted wheel assemblies in the direction indicated by the arrow, the endless tape 22 of the plotting unit 20 moves in the direction indicated by the arrows on the endless tape and the relative distance $r_1$ between the focal point $f_1$ and the marker $p$ increases. Simultaneously with the increase in the quantity $r_1$, the endless tape 22' of the plotting unit 20' is moved in a direction as indicated by the arrows on the endless tape and the effective distance $r_2$ between the point $f_2$ and the point $p$ is decreased. Since the wheel assemblies of the plotting units are mounted on a common shaft, the rotation of the wheels on the separate units is equal and the endless tapes 22 and 22' of the individual units consequently move an equal distance. Therefore, the quantity $r_1$ is increased by exactly the same amount that the quantity $r_2$ is decreased and the sum of the quantities $r_1$ and $r_2$ is therefore equal to the constant $k$.

The values of the terms $r_1$ and $r_2$ may be ascertained directly from the indicating means on the plotting units. For instance, the quantity $r_1$ may be measured by zeroing the graduated scale 41 on the endless tape 22 at the vernier scale 40 in the manner described heretofore, in which case the reading of the graduated scale 41 in cooperation with the vernier scale 52 is a direct measurement of the quantity $r_1$. Similarly, the quantity $r_2$ may be measured from the indications on the vernier scale 40' of the plotting unit 20' and the indications on the indicating means 23' of that unit. The constant $k$ of the ellipse equation is designated as the family parameter and its mechanical equivalent is represented by the relative movement of the endless tapes 22 and 22' as they pass over their respective wheels at the point $p$. Depending on the direction of the tape movements the effective length of the tapes will be either increased or decreased by an amount which is dependent upon the rotation of the wheel assemblies. Since the wheels are mounted on a common shaft there is no relative rotation therebetween but the measurement of the movement of the tape thereover in opposite directions which represents the constant $k$ may be facilitated by the upright vernier scale 82 on the rotating plate 79 which simultaneously registers with both of the graduated scales 41 on the endless tapes 22 and 22' in a manner best shown in Figs. 23 and 24.

The measurement of the relative movement of the tapes is a direct indication of the family parameter of the elliptical curves and is of great importance in the mathematical analysis of these elliptical patterns. By providing a measurement of the quantities $r_1$ and $r_2$ and of the family parameter $k$ information is available from which all of the family curve constants of an ellipse may be ascertained. For instance, the constant $k$ may be shown by the mathematical analysis which follows to be equal to the quantity $2a$ in which "$a$" represents one-half of the major axis of the ellipse.

Referring to Fig. 31 which illustrates two complete plotting units interconnected to transcribe an elliptical pattern, it can be seen that when the tracer connected at the point $p$ is moved along the elliptical curve to the point $x$, the vernier scale 82 in cooperation with the endless tapes in registry therewith indicates the parameter $k$ in the manner heretofore described and the quantity $r_2$ will be indicative of the distance from $f_2$ to $x$. At this same position the quantity $r_1$ will indicate the distance from $f_1$ to $x$. The half major axis "$a$" is equal to the distance "$ox$" since the entire major axis, $2a$, is equal to the distance from $x$ to $x_1$. From these relationships it can be shown that:

$$xx' = 2a = (x'f_1) + (f_1f_2 + f_2x)$$

but, $$x'f_1 = f_2x = r_2$$

and, $$f_1f_2 + f_2x = r_1$$

thus, $$2a = r_1 + r_2$$

but, by the general ellipse equation:

$$k = r_1 + r_2$$

and therefore, $$r_1 + r_2 = k = 2a$$

Hence it can be seen that the indication of the quantity $k$ provides a means for ascertaining the value of the major axis of the ellipse.

In similar manner, the quantity $b$ which represents the half minor axis may be derived as follows: at the point $x$, $f_1f_2 = r_1 - r_2$, which can be directly ascertained from a reading of the indicating scales showing the quantities $r_1$ and $r_2$ as indicated above. Therefore, having ascertained the quantity $f_1f_2$, it can be shown that $$f_1f_2 = 2\sqrt{a^2 - b^2}$$

from which $$b = \sqrt{a^2 - \frac{f_1f_2}{4}}$$

Since the quantity $a$ is known to be ½ $k$ as measured by the vernier scale 82, and the quantity $f_1f_2$ may be ascertained from the scale readings of $r_1$ and $r_2$ at the point $x$, it is apparent that the value of $b$ may be computed. Having ascertained the quantities $b$ and $a$, it can be shown that the value of the latus rectum, which is a line passing through either focus of the ellipse perpendicular to the major axis as represented by the letters LR in Fig. 31, is equal to:

$$\frac{2b^2}{a}$$

It can also be shown that the eccentricity "$e$" of the ellipse is equal to:

$$\sqrt{\frac{a^2 - b^2}{a}}$$

It thus becomes apparent that by directly reading the scale values of $r_1$ and $r_2$ and of the quantity $k$, all of the family curve constants for the ellipse may be measured or computed from the scale indications.

Although the ellipse generated by the assembly of Figs. 19 and 31 has been indicated as being produced by actuating the clamping means 25a and 25a' of the plotting units to produce a single elliptical curve, it is manifest that by releasing the locking pressure on the clamps and unlocking the joined wheel assemblies the plotting units 20 and 20' may be lengthened or shortened to any desired position as shown on the indicating means 26 in order to produce other elliptical curves having common foci $f_1$ and $f_2$. The effect of lengthening or shortening the plotting units is to change the value of the family parameter $k$, and hence it can be seen that any number of ellipses constituting a single family may be produced from the same foci $f_1$ and $f_2$, the separate elliptical curves having different values of $k$. When the wheel assemblies at the apex of the plotting assemblies are free to rotate relative to each other, the scale reading on the vernier 82 directly measures the differential rotation, and hence provides an indication of the family parameter $k$ for any ellipse which may be transcribed by the units.

There is shown in Fig. 20 an alternative assembly for generating elliptical curves in which the clamping means 25b and 25b' of the plotting units 20 and 20', respectively, are actuated in order to lock the inside portions of the endless tapes at the positions $c_1'$ and $c_2'$ as shown. As before, the positioning means are located respectively at the foci $f_1$ and $f_2$ and the sliding assemblies 24 and 24' positioned on the units, so that a constrained system is again produced in which the tracer at the point $p$ follows an elliptical curve. It can be seen that rotation of the jointly mounted and locked wheel assemblies of the plotting units in the direction indicated by the arrow in Fig. 20 results in a movement of the endless tapes 22 and 22' in directions which are indicated by the arrows appearing on these tapes. More specifically, counterclockwise movement of the joined wheel assemblies moves the endless tape 22 through the fixedly positioned sliding assembly 24 thereby increasing the effective length of the plotting unit 20 from the focus $f_1$ to the point $p$. Simultaneously therewith the movement of the endless tape 22' through the plotting unit 24 decreases the effective length of the plotting unit 20' thereby decreasing the distance from $f_2$ to the tracing point $p$. Since the tape movement of each of the plotting units over the wheel assemblies is equal, the sum of the distances $f_1p$ and $f_2p$ will remain constant. As before, the sum of these distances is represented by the quantity $k$, termed the family parameter of the ellipse and measured by the vernier scale 82 in alignment with the graduated scales 41 and 41' on the endless tapes 22 and 22', respectively. The curve constants of the ellipse produced by the assembly of Fig. 20 are determined in exactly the same manner as described in conjunction with the ellipse generated by the assembly shown in Figs. 19 and 31. As indicated above, the clamping means 25b and 25b' may be actuated at any desired position along the endless tapes in order to produce a family of elliptical curves having common foci $f_1$ and $f_2$ by unlocking the joined wheel assemblies and moving the endless tapes through the sliding assemblies 24 and 24'.

There is shown in Figs. 21 and 33 an assembly of a pair of plotting units which may be utilized to produce a hyperbolic curve, the units in Fig. 21 being shown in broken away portions, and the units of Fig. 33 being shown in their entirety as connected in order to produce a family of hyperbolas. As illustrated in Fig. 21, the sliding assemblies 24 and 24' are positioned respectively at the foci $f_1$ and $f_2$ of the hyperbolas, and the clamping means 24a and 25b' are simultaneously actuated to lock these sliding assemblies to the endless tapes 22 and 22'. The wheel assemblies of the plotting units are locked together for joint rotation at the point $p$, at which point the marking attachment 38 is inserted. It now becomes apparent that a constrained unit is again produced in which the rotation of the locked wheel assemblies causes the endless tapes 22 and 22' to move through the sliding assemblies 24 and 24', thereby varying the effective length of the plotters 20 and 20'. It can be seen that rotation of the joined wheel assemblies in a counterclockwise direction, as indicated by the arrow, moves the endless tape 22 over the wheel assembly of the plotter 20 and through the sliding assembly 24 in the direction of the arrow appearing on the tape. This movement of the tape decreases the effective length of the plotting unit 20 between the focus $f_1$ and the marker at the point $p$. Simultaneously therewith counterclockwise rotation of the joined wheel assemblies causes the endless tape 22 to move over the wheel assembly of the plotter 20' and through the sliding assembly 24 in a direction as indicated by the arrow on the tape 22'. Manifestly this movement decreases the effective length of the plotting unit 20' between the focal point $f_2$ and the marker positioned at the point $p$. Since the endless tapes 22 and 22' move over the joined wheel assemblies at an equal rate, it is apparent that the distances from $f_1$ to $p$ and from $f_2$ to $p$ will be decreased at a constant rate. It now becomes apparent that the joint movement of the endless tapes causes the plotting assembly of Fig. 21 to satisfy the condition for producing a hyperbolic curve, that is, $r_1+k=r_2$. The distance from $f_1$ to $p$ is represented by the quantity $r_1$ and may be measured by zeroing the graduated scale 41 on the endless tape 22 at the vernier scale 40 and by reading the scale 40' on the opposite side of the slide assembly, in which case the scale reading is actually twice the value of $r_1$. Of course, the quantity $r_1$ may also be measured by zeroing the graduated scale 41 on the endless tape at the vernier scale 40 and reading the vernier 52 to provide a direction indication of $r_1$. The distance $f_2$ to $p$ is represented by the quantity $r_2$ and may be measured as outlined above by the indications on the vernier scale 40' in cooperation with the graduated scale 41 on the endless tape 22' and the scale 52 on the wheel assembly of the unit 20'.

As in the assembly for producing ellipses, the wheel assemblies of the individual plotting units are locked together for joint rotation to prohibit relative rotation therebetween, and the vernier scale 82 which is aligned with the graduated scales on the endless tapes 22 and 22' provides a measurement of the constant $k$ of the hyperbolic curve by indicating the relative movement of the endless tapes 22 and 22' over the wheel assemblies. When the wheel assemblies of the individual units are released to permit relative rotation, the vernier scale 82 measures the differential rotation between the two wheels and thereby provides a continuous indication of the varying parameter $k$ for a family of hyperbolic curves. The measurements of $r_1$ and $r_2$ when taken with the family parameter indication provide sufficient information to enable a complete tabulation of all of the curve constants of each hyperbola. For instance, referring to Fig. 33, it can be seen that the value of the transverse axis of the hyperbola which is equal to $2a$ may be measured when the marker is moved to the point $p'$, in which case the distance $f_1p'$ will be indicated by the quantity $r_1$, and the distance $f_2p'$ will be measured by the quantity $r_2$. The transverse axis $2a$, as mathematically derived below, is equal to the difference, $r_2$ minus $r_1$, when the marker is at the point $p'$; and, since $r_2$ minus $r_1$ is equal to the constant $k$, the value of the transverse axis may be measured directly from the vernier scale 82. The relationship between the parameter $k$ and the transverse axis may be established by referring to Fig. 33 when the marker is at the point $p'$. It can be seen that the distance $f_1f_2$ is equal to $f_1p'+f_2p'$; but, $f_1p'=r_1$, $f_2p'=r_2=2a+f_1p'$; substituting, $r_2=2a+r_1$ subtracting, $r_2-r_1=2a$; but by the general hyperbolic equation $r_2-r_1$ also equals $k$ and, therefore, $k=2a$. The value of the latus rectum may be directly measured by the value of $r_1$ at the point $p$ as shown in Fig. 33 in which the point $p$ is located on the hyperbolic curve when the plotting unit 20 is positioned perpendicular to the center line CL joining the two foci of the hyperbola. When the plotting unit 20 is in this position, the value $r_1$ will be equal to one-half of the latus rectum LR. It can be established that:

$$LR = \frac{2b^2}{a}$$

where $b$ is equal to one-half of the coinjugate axis of the hyperbola. Consequently, having measured the value of LR and of the transverse axis $a$, the value of $b$ may be ascertained. It can also be proven that the distance from the center "O" to either of the foci of the hyperbola is equal to $\sqrt{a^2+b^2}$, which quantity may be calculated from the known values of $a$ and $b$ or, alternatively, may be measured by ascertaining the values of $r_1$ and $r_2$ when the tracer is at the point $p$ in which instance the distance from "O" to either of the foci will be equal to one-half of the sum of $r_1$ and $r_2$. The eccentricity "$e$" of the hyperbola may be shown to be equal to:

$$\frac{\sqrt{a^2+b^2}}{a} \text{ or } \frac{\text{distance from ``O'' to either focus}}{a}$$

which may be calculated directly from the measured quantities. The asymptotes of the hyperbolas are designated by the reference characters $x$ and $x'$ in Fig. 33, and are defined as a pair of lines intersecting at the center of the hyperbolas, toward which the branches of the hyperbolic curve approach to an infinitesimally small distance. The slopes of these asymptotes may be shown to be equal to plus or minus $$\frac{b}{a}$$

or plus or minus $$\frac{a}{b}$$

depending upon the direction in which the branches of the particular hyperbolic curve extend. Having measured $a$ and calculated $b$, it is apparent that the slopes of the asymptotes may be readily computed. Hence, it becomes apparent that all of the curve constants for the hyperbolas may be measured directly or computed in a facile manner from the measured quantities.

Although the plotting units shown in Figs. 21 and 33 have been described as interconnected to produce a single hyperbolic curve, it will be appreciated that by manipulating the clamping means 25a and 25b' and unlocking the joined wheel assemblies, a family of hyperbolic curves may be produced. To generate a family of hyperbolas having common foci $f_1$ and $f_2$, the sliding assembly 24 is maintained at the focus $f_1$ and the endless tape 22 is moved therethrough to either increase or decrease the effective length of the plotting unit 20 from the focus to the tracer at the point p. Similarly, the sliding assembly 24' is maintained at the focus $f_2$ moved therethrough in order to increase or decrease the effective length of the plotting unit 20'. The endless tapes may be moved to any preselected position and clamped by again actuating the clamping means 25a and 25b' to produce a constrained system for generating other hyperbolic curves having the foci $f_1$ and $f_2$. The effect of changing the positions of the clamping means with respect to the endless tapes is to vary the hyperbolic curve constant k so that a complete family of hyperbolic lines may be transcribed. As indicated above, the variations of k are measured by the relative rotation between the wheel assemblies as indicated on the upright vernier 82.

Although the hyperbolas of Fig. 21 are produced by simultaneously actuating the clamping means 25a and 25b', it is apparent that the same results would be achieved by releasing the locking pressure on the clamping means 25a and 25b', and simultaneously actuating the clamping means 25b and 25a'. Obviously, the only effect of interchanging these clamping means is to provide a constrained system in which the endless tapes 22 and 22' are clamped at their inside and outside positions, respectively, whereas in the prior assembly these tapes were clamped at their outside and inside positions, respectively.

Essentially, the assembly of the plotting units to produce hyperbolic curves consists of a system having a pair of joined arms in which each of the arms is pivoted about one of the foci of the hyperbola and the effective length of the two arms from each foci to the junction point is varied directly. In this manner the quantities $r_1$ and $r_2$ are increased or decreased by exactly the same amount, thereby satisfying the conditions for generating a hyperbolic curve. This system differs from the assembly for producing ellipses only to the extent that, in the latter assembly, the lengths of the arm members from foci to junction point, as represented by the plotting units 20 and 20', vary inversely in order to satisfy the elliptical equation.

The plotting units for producing both ellipses and hyperbolas are interconnected in exactly the same manner, that is, the wheel assemblies are locked together and the sliding assemblies positioned at the foci, the curve variations being accomplished by selectively operating the clamping means to produce a preselected type of curve of predetermined magnitude. As pointed out previously, the fixed position at the foci of the curves need not be established by the positioning attachment 37, as shown in Figs. 19, 20 and 21, but, alternatively, this fixed position may be provided by an assembly such as that shown in Fig. 18. As illustrated in this figure, the plotting units 20 and 20' are interconnected to produce the desired curves upon a drawing board 86 or the like. The fixed position at the foci $f_1$ and $f_2$ is provided by the drawing board clamp 87 and the pivoted extender arms 83, which may be moved to any position on the drawing board and clamped by applying pressure through the wing lock nuts 85 and 88. The positioning pin 89 may thereby be oriented at any desired position to establish a focal point and to receive one of the sliding assemblies of the plotting units. The operation of the plotters to produce elliptical or hyperbolic curves after the fixed position has been established is exactly the same as that heretofore described. The main disadvantage of positioning means of this type arises from the blind spots which would be produced in the curve due to the inability of the tracer to cover those areas of the drawing board located beneath the extenders 83.

It will be apparent that the establishment of the foci by the apparatus shown in Fig. 18 may not be sufficiently precise to satisfy rigid standards which may sometimes be required, and, for that reason, elliptical and hyperbolic curves may also be produced by interconnecting the plotting units as shown in Figs. 22, 23, and 24. These figures illustrate the use of extender arms 94 and 94' for effectively increasing the length of the plotting units 20 and 20' in order to produce curves of comparatively large magnitude. The length of the plotting units would be somewhat excessive and the units would, therefore, be difficult to manipulate if plotting units were utilized having a length consonant with the curve to be produced. To provide a means for effectively lengthening the units without increasing the physical dimensions, the extenders 94 and 94' may be positioned respectively at the foci $f_1$ and $f_2$ of the curves to be generated. One end of each of the extenders is in turn attached to the sliding assembly of one of the plotting units, so that the unit to which the extender is connected may be moved lengthwise of the extender. More specifically, the extender 94 is pivotally mounted about the focal point $f_1$ by any of the positioning means heretofore described and the other end of the extender is secured to the sliding assembly 24 of the plotting unit 20. One of the clamping means of the sliding assembly locks the slide to the endless tape 22 so that the movement of the tape over the joined wheel assembly 21a causes the slide to move along the frame members 42 thereby moving the plotting unit lengthwise of the extender 94. The direction of movement of the plotting unit to either increase or decrease the distance from the focus $f_1$ to the point p at the junction of the wheel assemblies will be dependent upon the direction of movement of the endless tape 22 and upon the particular clamping means 25a or 25b which is actuated. Similarly, one end of the extender arm 94' is pivotally mounted about the focal point $f_2$, and the other end of the extender arm is secured to the sliding assembly 24'. The slide 24' may be moved along the frame members 42' by moving the endless tape 22' over the wheel assembly 21a' when one of the clamping means 25a' or 25b' is actuated. The movement of the sliding assembly along the frame members causes the plotting unit 20' to move lengthwise of the extender arm 94' in a direction which is again dependent upon the direction of movement of the endless tape 22' and upon the particular clamping means 25a' or 25b' which is actuated.

Manifestly the assemblies shown in Figs. 22, 23 and 24 may be utilized to produce either hyperbolic or elliptical curves by selectively actuating the clamping means in the manner heretofore described. The tracer inserted at the point p will be induced to follow the desired curve pattern by providing a constrained system which is equivalent to those systems already described except for the addition of the extender arms 94 and 94' to increase the effective range of the plotter.

Each of the assemblies described up to this point has considered the actuation of the plotting units as being accomplished by hand, as, for example, by use of the rotating plate 79 which is attached to the joined wheel assemblies of the individual plotters in order to permit manual operation by means of the finger grip 81. However, movement of the plotters may also be attained by mechanical movement to increase the smoothness of operation by attaching a spring-wound mechanism or an electric motor to drive the coaxial wheel pair. It will be understood that to provide this mechanical movement, the rotary movement transmitting washer 92 may be utilized to interconnect the joined wheel assemblies with a splined shaft on the driving mechanism through the key 93a.

Turning now to a detailed description of the component parts necessary for an assembly of two plotting units to provide a conic section drafter, such an assembly may be effected by coaxially interconnecting the wheel assemblies of two plotting units by inserting the positioning attachment or other positioning means through the opening in the cylindrical journal 50. The assemblies are interconnected wheel to wheel, and are separated by a washer 75, one of the apertures in the washer serving to accommodate the pin 53c on the lower face of the upper wheel assembly, and the other aperture registering with the pin 53a on the upper face of the lower wheel assembly. In this manner the wheel assemblies are interconnected for joint rotation and are locked together by the washer 75. The sleeve bolt 61 of the marking attachment 38 is inserted through the aligned cylindrical journals 50, and a washer 75 is placed between the lower wheel assembly and the washer 63 on the sleeve bolt. One of the apertures in the washer 75 accommodates the pin 64, whereas the other aperture of the washer registers with the pin 53c on the lower face of the lower wheel assembly. A marker 66 may be inserted within the sleeve bolt 61, and the locking nut 62 may then be tightened in order to lock together the joined wheel assemblies and the marking attachment 38.

If the orientation of the plotter is established by the positioning means 37, the stub shaft 54 is inserted through the opening 36 in the sliding block 27, and the collar 56 serves to separate the washer 58 from the lower face of the block. In this manner the sliding assembly is free to pivot above the shaft 54 and the plotting units may be rotated to any desired position.

Referring now to Fig. 32, there is shown an assembly of two plotting units which are interconnected to produce a parabolic curve. As there shown, the sliding assembly of one of the plotting units is positioned at the focus $f_1$, whereas the sliding assembly 24' of the second plotting unit 20' is positioned at a fixed distance from the directrix D of the parabola. The wheel assemblies of the two plotting units are joined together at the point $p$, and a marking attachment is secured to the joined wheel assemblies as described above in conjunction with the production of ellipses and hyperbolas. To induce the marker to transcribe a parabolic curve, it is essential that the distance from $f_1$ to $p$, which represents any point on the curve, remain equal to the distance from $p$ to the directrix D, and, to this end, the movement of the endless tapes 22 and 22' controls the effective length of the plotting units 20 and 20'. More specifically, the sliding assembly 24 is clamped to the endless tape 22 at the point $c_1$ by actuating the clamping means 25b and the sliding assembly 24' of the plotting unit 20' is clamped to the endless tape 22' at the point $c_2$ by actuating the clamping means 25a'. Positioned at right angles to the plotting unit 20' so as to extend parallel to or coincident with the directrix D is the straight edge attachment 78, which is fixedly mounted on the sliding assembly 24'. To generate a parabola, the operator of the plotting device moves the plotting unit 20' so that the straight edge 78 remains constantly parallel to and at a uniform distance from the directrix D. If a plotting unit of sufficient length were provided, the straight edge attachment 78 could be locked on the unit 20' at a point along the endless tape so as to extend along the line of the directrix, and, in this manner, the parabola could be generated by causing the straight edge 78 to move along the directrix. However, since the length of the plotting unit is limited to provide for facility of operation and to prevent awkwardness in handling, it is more convenient to locate the straight edge attachment and the slide 24' at a position along the plotting unit 20' somewhat nearer to the point $p$ than would be the case if this attachment were to fall along the directrix. By moving the plotting unit 20 so that the straight edge remains constantly parallel to the directrix D, the joined wheel assemblies are rotated in a clockwise direction as indicated by the arrow in Fig. 32. Clockwise rotation of the wheel assemblies moves the endless tape 22 over the joined wheel assemblies in the direction indicated by the arrow, and, since the endless tape is clamped to the sliding assembly at the position $c_1$, the effective length of the plotting unit 20 is increased as the tracer moves from the point $p$. Simultaneously with the increase in effective length of the unit 20, the endless tape 22' moves over the joined wheel assemblies to move the sliding assembly 24' along the plotting unit 20', thereby maintaining the straight edge attachment at a constant fixed horizontal distance from the directrix D. Since the wheel assemblies are locked together, the rate of movement of the tape 22 and that of the tape 22' is identical, thereby causing the straight edge attachment 78 to move horizontally along the plotting unit 20' at exactly the same rate as the increase in distance from the focus $f_1$ to the point $p$, thereby satisfying the condition for generating a parabola. The effect of assembling the units as described is to clamp the slides and tapes to follow an elliptical function in which one pivot point is at the parabolic focal point and the other pivot point is at infinity, a condition which results in a parabolic curve.

The curve constants for the parabola may be measured by the indicating means provided on the plotting units in a manner similar to the measurements made in plotting the ellipses and hyperbola. However, since the eccentricity "$e$" of a parabola is equal to unity, the measurements of the curve constants for parabolas are considerably less complex. More specifically, the distance from the vertex of the parabola to the focus $f_1$, which is represented by the quantity "$a$" in Fig. 32, may be measured directly from the indicating scales when the tracer is at the point $p$ shown at the vertex of the parabola. The latus rectum of the parabola which is designated by the line LR in Fig. 32 may be shown to be equal to $4a$, so that the value of this quantity may be ascertained by a direct measurement of the quantity "$a$" as indicated above, or, alternatively, by moving the tracer along the parabolic curve until the point $p$ coincides with either $x_1$ or $x_2$ as shown, at which time the indicating scales on the plotting unit 20 provide a direct measurement of one half of the latus rectum value.

The parabola just described was transcribed by simultaneously actuating the clamping means 25b and 25a' as for the elliptical function; however, a similar curve might be produced by releasing these clamping means and simultaneously actuating the clamps 25a and 25b'. It should be observed that the clamping means 25a' and 25b' correspond to the clamps 25a and 25b shown in Fig. 3 but are located on the second plotting unit. It should also be understood that the sliding assembly 24 may be clamped to the endless tape at any desired position therealong as indicated by the indicating means 26 by unclamping the locked wheel assemblies, thereby to produce a parabola of any preselected magnitude. In this manner a family of parabolic curves having a common focus $f_1$ may be generated by proper manipulation of the clamping means of the plotting units 20 and 20'. When the tape wheels are released to change the magnitude of the parabola being generated, the differential rotation between the wheels is displayed on the upright vernier 82 which provides a direct indication of the family parameter of the parabolic curves.

The ability of the plotting device of the present invention to follow a hyperbolic pattern provides a number of inherent uses in conjunction with radio positioning finding systems of the hyperbolic continuous wave type. In systems of the particular type referred to, the continuous waves radiated from separate pairs of transmitters bear a phase relationship which varies as a function of the changing position of a mobile receiving unit located in the radiation field of the spaced transmitting points. One particular system of this type is described in detail in Patent No. 2,513,316 to James E. Hawkins, assigned to the same assignee as the present invention, to which reference may be had for a complete understanding of the details of operation of such systems. Briefly, the system referred to in this patent includes at least three spaced transmitting points for radiating waves for reception at the mobile unit where they are heterodyned in pairs to develop beat signals for phase comparison with reference signals which are derived from heterodyning pairs of waves at a link transmitting unit and which are modulated upon a carrier wave radiated from the latter unit. The compared signals are characterized by equiphase lines which are hyperbolic in contour about the pairs of transmitting points as foci. On a line interconnecting each pair of transmitters, these equiphase lines are spaced apart a distance equal to one-half the mean wave length of the radiated waves and have diverging spacings at points on either side of this line. With this system arrangement the position of a receiving point relative to a pair of hyperbolic equiphase lines may be determined by measuring the phase relationship between continuous waves radiated from the pair of transmitters. Since the points of location of the receiving point between two equiphase lines are not indicated by such a phase measurement, it becomes necessary to employ at least three spaced transmitters, the separate pairs of which function to provide a grid-like pattern of intersecting hyperbolic lines in order to obtain absolute determination of the position of the receiving point.

The equipment at the mobile receiving unit includes means for receiving and distinguishing between wave radiations from the two transmitting pairs, and also includes at least two phase meters for establishing the phase relationship between signals from the separate pairs, thus identifying a pair of hyperbolic lines intersecting at the location of the mobile unit.

If the slide assemblies of three of the plotting units of the present invention are respectively positioned at the foci of the hyperbolic pattern, which foci are actually representative of the location of the three transmitting points of the radio direction finding system described above, and if the wheel assemblies of these three units are coaxially aligned for free rotation with respect to each other, the coaxial wheel assemblies may be utilized to indicate the position in space of the mobile receiving station. More specifically, the sliding assembly of a first of the plotting units may be pivotally mounted about a positioning means located at the first transmitting station on a map of the area under survey. The slide assemblies of the second and third plotting units may correspondingly be pivotally mounted about positioning means located respectively at the second and third transmitting points of the direction finding system.

If the wheel assemblies of these plotting units are joined together for free rotation and a marker inserted at the junction point, this marker may be induced to assume the position of the mobile receiving unit by selectively controlling the movement of each of the endless tapes on the separate plotting units in accordance with the phase of the wave signals received by the mobile receiving equipment. In order to effect controlled movement of the endless tapes in accordance with the phase relationships at the mobile receiving unit, one of the wheels of each of the three plotting units may be driven from phase-sensitive motors which are conventional in the art. Specifically, the phase-sensitive motors may be employed, in a manner to be described more fully hereinafter, to drive in pairs the commonly mounted wheel assemblies representing the mobile receiver position so that the tracer will accurately follow the variations in phase on the phase meters at the mobile station. By driving the wheel assemblies in accordance with these phase changes, the endless tapes on each of the plotters will be moved for a distance corresponding to the increments of phase change. Since the graduated scale 41 in cooperation with the verniers 40 and 40' on each of the individual plotting units may be utilized to measure the tape length between the slide assembly and the center point of the wheel assembly, it is apparent that the measurement of this tape length provides an indication of the distance between each of the transmitting points and the mobile receiving station of the direction finding system. By measuring the scale indications for all of the plotting units, an accurate measurement of distances between each of the transmitters and the receiver is facilitated, and a direct correlation may be established between the coordinate system of the map scale and the hyperbolic coordinates as registered by the indicating scales of the plotting units.

Although the description is herein limited to two-dimensional coordinate systems, it will be apparent to those skilled in the art that the principles of the plotting device as described are equally adaptable to three-dimensional systems by the addition of plotting units to provide indications in the third dimension. It should also be noted that a protractor disc 67 and vernier plate 74 may be positioned on each of the plotting units at the foci of the hyperbolic grid pattern in order to facilitate a determination of the azimuths or bearings of the mobile receiver with respect to any fixed line, such as a line joining the transmitter pairs or to a base line of the coordinate system.

If desired, the plotter may be employed to construct the equiphase hyperbolic pattern for the radio direction finding system by employing a drawing table which may be oriented at any predetermined position. Once the drawing board has been properly oriented, the hyperbolic pattern may be transcribed by manipulating the endless tapes on each of the plotting units to generate a family of hyperbolas having common foci at the transmitting station pairs in which the hyperbolic lines are separated by an amount corresponding to the map scale as measured by a distance of one-half wave length of the frequency of waves radiated from the transmitting stations on a base line joining the pairs of transmitters.

In assemblies wherein two coaxial wheels are mounted for independent rotation, the apparatus shown in Fig. 25 may be used to vary the relative rates of rotation of the wheels. The apparatus there shown may be adjusted in the manner described below to obtain a predetermined ratio between the rate of rotation of the coaxial wheels.

Thus, for example when the plotter is used as a position indicator in conjunction with the radio direction findings system of the type described above, the wheel rotations of the plotting assemblies and the consequent movement of the tapes will generally not correspond to the distance measurements of the map scale. To properly correlate the tape movements with the coordinate scale employed on the map in order to produce a one-to-one relationship, a conventional polar planimeter attachment 100, shown in Fig. 25, may be employed to vary the rotation of the wheel assemblies. When the rotation of the wheel assemblies is coordinated with the map scale, a direct reading of the hyperbolic coordinates of the radio direction finding system is presented irrespective of the map scale and the wave length of transmission employed. To this end the polar planimeter 100 may be attached to the coaxial, independently rotatable wheel assemblies in a manner similar to the attachment of the vernier plate 74 and the protractor disc 67 heretofore described. More specifically, a shaft 101 of the polar planimeter interconnects the lower wheel assembly and a planimeter plate or disc 102 in order to transmit the rotary motion of the lower wheel assembly to this disc. To facilitate the interconnection of the shaft 101 and the lower wheel assembly, this shaft may be splined so as to mesh with the key 93a on the rotary transmitting washer 92. Correspondingly, an outer shaft or tube 103 of the polar planimeter surrounds shaft 101 and connects the upper wheel assembly of the coaxially mounted pair to a rotatable frame 104 of the planimeter in order to transmit the rotation of the upper wheel to the latter frame.

In order to adjust the respective rates of rotation of the plate 102 and a rotatable disc or wheel 108 adjustably mounted on the frame 104, there is provided a planimeter adjusting means 105 which may assume any preselected position with respect to the plate 102. This planimeter adjusting means is movable along a bar 106 diametrically disposed above the plate 102 and constituting an element of the frame 104. The position of the planimeter adjusting means 105 along the bar 106 may be altered by means of a micrometer screw adjustment 107 which moves the rotatable disc 108 radially of the plate 102 to any preselected position. The position to which the disc 108 is moved will be directly determinative of the rate of rotation of this disc with respect to the rotation of the plate 102. For instance, if the disc 108 is positioned near the outer periphery of the plate 102, the rate of rotation thereof will be relatively large, since, for each revolution of the plate, the disc 108 travels over a circle having a large circumference and the disc is therefore rotated through a large number of complete revolutions. However, when the disc 108 is positioned near the center of the plate 102, one revolution of the plate 102 induces a relatively decreased travel distance of the disc 108 and, consequently, the number of revolutions of the disc 108 is considerably reduced. In order to provide a means for measuring the distance travelled by the rotatable disc 108, there is provided a polar planimeter counter designated generally by the numeral 109 in Fig. 25. The counter will thus display the differential rotation between the plate 102 and the frame 104, and, consequently, between the two wheel assemblies, since a rotation of the plate and frame in the same direction rotates the disc 108 only a slight amount and rotation in opposite directions considerably increases the rate of rotation of the disc. By adjusting the position of the disc on the plate 102 the correct ratio of rotation between wheel assemblies and movement of the counter 109 may be established in order to coordinate wheel rotation with the coordinate scale on the map.

One-to-one correspondence between the map scale and the readings of the phase meters at the mobile receiving station may be achieved empirically by a trial and error method in which one of the endless tapes is held in fixed position by simultaneously actuating both of its clamping means, and the other tape is moved through any predetermined linear distance, for instance, a distance equal to 100 wave lengths of the transmitted frequency. When the tape is moved through 100 wave lengths, the polar planimeter counter which measures the travel of the disc 108 over the plate 102 and which may be calibrated in degrees of phase shift should indicate a phase shift of exactly 200 lanes, a lane being defined as 360° of phase shift and being defined by adjacent equiphase lines on the grid. If the counter 109 does not indicate 200 lanes of phase shift, the radial position of the wheel 108 is altered and the above procedure is repeated until the proper change of reading on the counter is obtained.

Thus, for a three foci radio position finding system of the type described in the above identified Patent No. 2,513,316, three plotting units are required having three coaxial wheel shafts which are assembled in the manner previously described with the slides of the plotters respectively located at the foci and with the wheels coaxial and freely rotatable with respect to each other. The upper plotting unit has its slide positioned at a point corresponding to the position of the center transmitting station of the system and the upper wheel directly rotates a plate representative of the dial face of the first of the phase meters at the mobile receiving station. The lower wheel directly rotates a needle pointer or vernier which corresponds to the needle pointer of this first phase meter. The rotation of the plate may be varied to correspond to the map scale as indicated above, so that the pointer will accurately indicate the phase reading on the first meter. In similar manner, the center wheel directly rotates a needle pointer or vernier representative of the indicator of the second phase meter which, therefore, cooperates with the plate in order to accurately portray the phase reading on that meter. If the coaxial wheel assemblies are moved along one of the hyperbolic lines of the system the upper wheel assembly and one of the pointers rotate in the same direction and at the same rate so that the same indication is maintained, while the other pointer rotates with respect to the plate to indicate a change in phase meter reading. If the circumferences of the wheels are exactly equal to the wave length of the transmitters in terms of the map scale, the readings displayed on the dials attached to the wheel assemblies will exactly duplicate the phase meter readings for the corresponding map positions, and, if not, the polar planimeter attachment may be utilized to achieve correspondence. If the frequencies of the first and second transmitter pairs are not approximately the same as, for example, in a system of the type shown in United States Patent No. 2,513,317, to James E. Hawkins and Robert S. Finn, assigned the same assignee as the present invention, two center wheels and two center tapes must be utilized in place of the single center wheel just described in order to compensate for the frequency differences.

The versatility of the plotter of the present invention may be demonstrated by reference to Fig. 29 in which two of the plotting units are interconnected to provide a conventional drafting machine. The two units 20 and 20' are there illustrated having joined wheel assemblies 21a and 21a', respectively, which are interconnected to permit relative rotation therebetween. The wheel assembly 21b of the plotting unit 20 is pivotally mounted about the drawing board clamp 87, so that the unit 20 and the unit 20' may assume any desired position on the drafting board limited only by the length of the units. Rotatably movable with the wheel assembly 21b' of the plotter 20' is the straight edge attachment 78 which may be employed to draw straight lines at any desired angle or at any desired position on the drafting board 86. When connected in this manner, the clamping means 25a, 25b, 25a' and 25b' are all in their unlocked position so that uninhibited movement of the plotting units and straight edge attachment is provided.

To assemble the units as shown in Fig. 29, the drawing board clamp 87 is locked in position on the drafting board 86 with the positioning pin 89 and the locking washer 89a located directly on the clamp. The sleeve bolt 61 telescopes over the positioning pin 89 so that the aperture 65 registers with the attaching pin on the washer 89a. A washer 75 is next placed over the sleeve bolt 61 so that one of its apertures registers with the locking pin 64 on the washer 63. A frictionless washer 77 is next placed over the sleeve bolt followed by a second washer 75, one of the apertures of which accommodates the locking pin 53c on the lower face of the wheel assembly 21b which is next assembled on the sleeve bolt. Similar washers on the upper face of the wheel assembly 21b accommodate the locking pin 53a so that when the locking nut 62 is tightened the wheel assembly 21b is properly oriented on the drafting board in a freely rotatable position about the clamp 87.

The units 20 and 20' are interconnected by the sleeve bolt 61 which first receives a washer 75, the apertures of which accommodate the pin 64 on the washer 63, and the pin 53c on the lower face of the lower plotting unit which is placed over the sleeve bolt 61 after the washer 75. A second washer 75 is inserted on the sleeve bolt over the lower plotting unit so that its apertures register with the pin 53a on the upper surface of the lower plotting unit and with the pin 53c on the lower surface of the upper plotting unit. After the upper plotting unit is inserted over the sleeve bolt 61, a third washer 75 is assembled in order to register with the locking pin 53a on the upper face of the upper plotting unit, so that when the locking nut 62 is tightened the coaxial wheels 21a and 21a' are locked together for joint rotation.

The straight edge 78 is assembled on the wheel assembly 21b' by placing the straight edge attachment over a sleeve bolt 61, so that one of the apertures 78a receives the locking pin 64 on the washer 63, after which a washer 76 having upper and lower protruding pins is inserted over the sleeve bolt in order that its lower protruding pin will engage a second of the apertures 78a in the straight edge attachment 78. The upper locking pin of the washer 76 registers with one of the locking apertures 68 on the protractor disc 67 which is next inserted over the sleeve bolt 61 with the degrees side facing upwardly. The protractor disc 67 is thereby locked to the straight edge attachment 78 in order to indicate the rotation of this attachment with respect to the vernier disc 74 which is next placed over the bolt 61. The wheel assembly 21b' is next telescoped over the sleeve bolt, whereby the lower pin 53c thereon engages one of the apertures 74a in the vernier disc. To complete the assembly, a washer 70 is inserted over the sleeve bolt in order to engage its protruding pin 71 within another of the apertures 74a in the vernier disc and to register its aperture 72 with the upper pin 53a on the wheel assembly 21b. When the locking nut 62 is tightened, the straight edge attachment 78 constantly maintains the same parallel position with respect to the drafting board so that a conventional drafting machine is provided.

The movement of the joined wheel assemblies 21a and 21a' moves the endless tapes 22 and 22' over the wheel assemblies at an equal rate, and therefore the straight edge attachment 78 assumes a parallel position irrespective of the movement of the plotting units. The angular position of the straight edge may be changed by unclamping the lock nut 62 at the junction of the wheel assemblies 21a and 21a' in which event the endless tape of the plotting unit 20' may be moved to rotate the wheel 21b' until the straight edge attachment 78 assumes any desired position as indicated by the matching protractor disc 67 and vernier scale 74. When the straight edge attachment reaches the preselected position, pressure may again be applied to the locking nut 62 at the junction of the coaxial wheel assemblies. The plotting units 20 and 20' may be locked at any position on the drafting board to freeze the straight edge attachment at any desired point merely by clamping one pair of the tape clamps 25a and 25b, or 25a' and 25b'. The simultaneous application of locking pressure to the endless tape 22 through the clamping means 25a and 25b locks the endless tape 22 in position and prevents movement of the joined coaxial wheel assemblies 21a and 21a' thereby freezing the plotting units. Similarly, the simultaneous application of pressure through the clamping means 25a' and 25b' to opposite sides of the endless tape 22' prevents movement of the joined wheel assemblies and also locks the plotting units in a preselected position.

A further use of the plotting device of the present invention is illustrated in Fig. 30, wherein a pair of plotting units 20 and 20' are assembled to provide a simple one-to-one pantograph. As shown in Fig. 30, a map or other similar plane surface configuration 110 may be reproduced on a copy sheet 110' by assembling a pair of plotting units in such position that one of the units may be used as a tracer to induce movement of the second unit as a reproducer. More specifically, to provide this simple pantograph, a pivot point $f$ is established between the original sheet 110 and the copy sheet 110' by means of the positioning attachment 37 or other suitable positioning means. Two of the units are fastened frame-to-frame so that all of their attachment holes are colinear and the two assembled units form one rigid aligned structure. The two wheel assemblies 21a and 21a' of the separate plotting units are joined together so as to lock their coaxial wheels for joint rotation in the manner heretofore described, and the coaxial wheel assemblies are placed over the positioning means at the pivot point $f$ after suitable washers have been selected to provide free rotation of the aligned plotting units 20 and 20' about the pivot point. The radii from the pivot point $f$ to the cross head centers $p_1$ and $p_2$ are next set equal by reference to the indicating means on the two plotting units 20 and 20' as described in detail above. The endless tapes 22 and 22' are clamped on opposite sides in order to provide for simultaneous movement of the cross heads toward or away from the pivot point $f$. To this end the clamping means 25a and 25b' may be simultaneously actuated so that counterclockwise rotation of the joined coaxial wheel assemblies 21a and 21a' induces movement of the sliding assemblies 24 and 24' toward the pivot point $f$, whereas clockwise rotation of the joined wheel assemblies induces simultaneous movement of the sliding assemblies away from the pivot point. Since the endless tapes 22 and 22' move over the wheel assemblies at exactly the same rate, the movement of the sliding assemblies 24 and 24' along the frame members 42 and 42', respectively, will be equal. It is to be understood that the same movement could be accomplished by releasing the locking pressure on the clamping means 25a and 25b', and by simultaneously actuating the clamping means 25b and 25a'.

To provide a means for tracing the pattern on the original sheet 110, a tracer is attached to the sliding assembly 24 at the point $p_1$ by inserting the sleeve bolt 61 through the transverse hole 36 in the sliding block, after which a tracer may be inserted within the hollow of the sleeve bolt. Similarly, to provide a means for reproducing the traced pattern on the copy sheet 110' upon movement of the tracer at the pint $p_1$, a marker 66 may be attached to the slide 24' at the point $p_2$. Movement of the tracer to follow the configuration of the original sheet 110 causes the endless tape 22 to move over the joined coaxial wheel assemblies thereby to rotate the wheels and move the endless tape 22'. Movement of the tape 22' moves the slide 24' along the plotting unit 20' by an amount equal to the movement of the slide 24 along the plotting unit 20 and, therefore, the marker 66 at the point $p_2$ reproduces the original configuration on the copy sheet 110'. Since the plotting units 20 and 20' rotate about the pivot point $f$ in the same direction, it is apparent that movement of the plotter 20 from right to left as shown in Fig. 30 causes the plotting unit 20' to move from left to right and, therefore, the pattern reproduced on the copy sheet 110' is actually rotated through an angle of 180° with respect to the original configuration 110.

The scale of the reproduced pattern will be identical to that of the original sheet 110, since the tape movements of the individual units are equal, and, therefore, the assembly shown constitutes a one-to-one pantograph. To provide a scaled reproduction of the original sheet, it is necessary to interconnect four of the plotting units in rectangular fashion, as will be readily appreciated from an examination of a conventional scaled pantograph.

The assemblies heretofore discussed have for the most part been constrained units in which the coaxial wheel assemblies have been locked together to prohibit relative rotation therebetween. However, for many purposes it is desirable that the individual wheel assemblies of the plotting units be interconnected to permit relative rotation and to display the angular differential rotation of the two wheels at a readily accessible and easily readable position. To this end it is an advantage to display the differential rotation between the wheels upon the protractor disc 67 and the vernier plate 74 at a position above the coaxial, freely rotatable wheel assemblies.

To provide for such a display, the sleeve bolt 61 may be locked to one of the aligned wheel assemblies by interconnecting the protruding attachment pin 53c and the attachment pin 64 on the washer 63 by means of a washer 75, which interconnection induces the sleeve bolt to rotate with the wheel assembly. The movement of the sleeve bolt may be transmitted to a position above the aligned wheel assemblies by inserting the transmitting washer 92 over the bolt and registering the key 93a with the key receiving slot 93b in the bolt. The vernier scale 74 may be secured to the sleeve bolt 61 for rotation therewith by matching one of the apertures 74a with the locking pin 92b on the transmitting washer 92. In this manner the rotation of the wheel assembly is transmitted to the vernier plate 74. To provide a means for measuring the angular differential rotation between the joined pair of wheel assemblies, the protractor disc 67 may be mounted on the upper wheel assembly so as to rotate therewith in a position just below the vernier plate 74 which is rotatable with the lower wheel assembly. Therefore, the protractor disc 67 and the vernier plate 74 are aligned to provide an indication of the angular rotation between the coaxial wheel assemblies, and, by providing the transparent vernier scale 82 which simultaneously aligns with the protractor disc graduations and the graduations on the vernier plate, the reading of this angular differential rotation is facilitated.

This display of differential rotation is particularly important when the plotting units are assembled to form a differentiator as shown in Fig. 34. For purposes of convenience in illustrating the use of the plotting units to provide a measurement of differential of a curve region, there is shown in Fig. 34 a coordinate system having an abscissa $x$ and an ordinate $y$, together with straight lines forming angles of 30°, 45° and 60°, respectively, with respect to thte abscissa in the first quadrant of the system. Let it now be assumed that it is desired to measure the slope of the 45° line, in which case the two plotting units 20 and 20' may be interconnected as described above at the point $p$ in order to provide for free rotation between their joined wheel assemblies. As described in detail above, the angular differential rotation between these coaxial wheel assemblies is displayed on the matching protractor disc and vernier plate positioned above the coaxial wheel assemblies of the plotting units. For purposes of illustration, the positioning attachment 37 may be located at a point $f_1$ on the ordinate of the coordinate plotting system and a second positioning attachment located at the point $f_2$ on the abscissa of the system, although it should be understood that these positioning means need not necessarily be located on the axes of the system. The sliding assembly 24 is oriented with respect to the coordinate system at the point $f_1$ and the sliding assembly 24' is oriented at the point $f_2$. A tracer may be attached to the coaxial wheel assemblies at the point $p$ in order to provide a means for following the line to be differentiated. The sliding assembly 24 may be clamped to the endless tape 22 by actuating the clamping means 25b and simultaneously therewith the sliding assembly 24' may be locked to the endless tape 22 by actuating the clamping means 25a'. As the tracer is moved along the 45° line from its position as shown at the origin of the coordinate system, the wheel assembly of the plotting unit 20 will be rotated in a clockwise direction as represented by the arrow in Fig. 34 in order to move the endless tape 22 in a direction which is indicated by an arrow appearing on the tape 22. This movement of the endless tape shortens the effective length of the plotting unit 20 and decreases the distance between the point $f_1$ and the tracer at the point $p$. Similarly, the movement of the tracer along the 45° line induces clockwise rotation of the wheel assembly of the plotting unit 20', and moves the endless tape 22' in the direction indicated by the arrow appearing on that tape. The effect of the movement of the endless tape 22' is to decrease the distance between $f_2$ and the tracer $p$. Since the tracer follows a 45° line, the increment of distance variation between $f_1$ and $p$, and between $f_2$ and $p$, will occur at exactly the same rate and, therefore, the tape movements will be equal. Since the movements of the tapes 22 and 22' are equal, the rate of rotation of each of the wheel assemblies is the same and, furthermore, since the rotation of both of the wheel assemblies is in the same direction, there is no angular differential rotation therebetween. Consequently, a slope of unity will be indicated by the transparent vernier scale 82 in registry with the protractor disc 67 and the vernier plate 74.

Let it next be assumed that it is desired to measure the slope of the 60° line as shown in Fig. 34, in which case the tracer at the point $p$ will be moved to follow this line. The tape movements and angular rotation of the wheel assemblies of both of the plotting units will be in the same direction as described for the 45° measurement; however, the rate of movement of the endless tapes will be different. For instance, it can be seen that as the tracer at the point $p$ moves along the 60° line, the effective length of the plotting unit 20 from $f_1$ to the point $p$ must decrease at a considerably faster rate than the decrease of the effective length of the plotting unit 20' from $f_2$ to the point $p$. Consequently, the endless tape 22 must move faster than the endless tape 22', and, correspondingly, the wheel assembly of the plotting unit 20 rotates at a greater rate than the rotation of the wheel assembly of the plotting unit 20'. As indicated above, the difference in angular rotation between the two wheel assemblies is indicated directly on the vernier plate 74 and the protractor disc 67 by means of the scale 82. Actually, when the tracer follows a 60° line, the wheel assembly of the plotting unit 20 rotates twice as fast as the wheel assembly of the plotting unit 20', and a slope of two will, therefore, be indicated on the measuring means. It can, therefore, be seen that the rate of movement of the endless tape 22 is directly proportional to the slope of the line which is being measured, and the rate of movement of the endless tape 22' is inversely proportional to this slope. The differential rotation between the wheel assemblies which is a measure of the relative rate of movement of the endless tapes 22 and 22' is, therefore, dependent upon the slope of the line being measured.

The ability of the plotting units of the present invention to function as a differentiator and as a basic computing device may best be appreciated by reference to Fig. 35, which shows a circle having a radius "$r$", and a plurality of tangents $T_1$, $T_2$, $T_3$ . . . $T_n$ to the outer periphery of this wheel. Positioned on the tangents are a plurality of reference points $P_1$, $P_2$, $P_3$ . . . $P_n$ which are located, respectively, at predetermined distances from the points of tangency of the tangents $T_1$, $T_2$, $T_3$ . . . $T_n$. If the circle is rotated along the tangents, the mathematical operations of subtraction and addition are performed on the tangential lengths from the reference points to the points of tangency. For instance, counterclockwise rotation of the circle through an angle $\theta$ causes the distance from $P_1$ to the point of tangency of $T_1$ to be increased by an amount equal to $r\theta$ and, similarly, the distance from $P_2$ to the point of tangency of $T_2$ decreases by an amount equal to $r\theta$. Each of the other tangents functions in a similar manner to perform these additions and subtractions.

This principle is converted to mechanical structure in the present invention by substituting a wheel for the circle, tensioned metallic tapes for the tangents, and employing a cross bar and clamping means to establish the reference points on the lines of tangency. The movement of the endless tapes enables the mathematical functions to be directly correlated to the mechanical movements of the structure, and, therefore, the relationship between the tangents and the circle is preserved and displayed in terms of linear and angular measurements. In this manner, the differential angular rotation of the wheels directly represents the variations in tangential lengths of the endless tapes and a differentiating function is achieved.

Let it next be assumed that the tracer at the point $p$ is moved along the 30° line to measure the differential thereof, in which event the endless tape 22' must move much faster than the endless tape 22 in order to decrease the distance between $f_2$ and $p$ at a rate considerably in excess of the rate of decrease of the distance between $f_1$ and $p$. Since the movement of the wheel assembly of the plotting unit 20' is dependent upon the rate of movement of the endless tape 22', and the movement of the wheel assembly of the plotting unit 20 is dependent upon the rate of movement of the endless tape 22, the angular differential rotation between these two wheel assemblies as measured by the protractor disc 67 in the vernier plate 74 will indicate a slope of one-half for the 30° line. Actually, the angular differential dimensional rotation of the wheel pair is a measurement of the tangent of the slope angle, and for this reason the slope of any straight line may be measured with a fair degree of accuracy by employing the plotting units in the manner just described.

The plotting units of the present invention provide a convenient means for demonstrating the conventional trigonometric functions when three of the units are interconnected to form a triangle as indicated in Fig. 26. As there shown, the units 20 and 20' are connected wheel to wheel at the point "$a$," and are relatively disposed at an angle A with respect to each other. The plotting unit 20 forms one side of the triangle and is connected to a third plotting unit 20" at the point $b$ so as to form an angle B therewith. The plotting units 20 and 20" are interconnected slide to slide, and are free to pivot one about the other in order to vary the magnitude of the enclosed angle B. The unit 20" forms a second side of the triangle, and the triangle is completed when the wheel assembly of the unit 20" is connected to the sliding assembly of the unit 20' at the point $c$ so as to include an angle C between the two disposed units. The graduated scales 41 in conjunction with the vernier scales 40 and 40' on opposite sides of the sliding assemblies of each of the plotting units provide a means for directly measuring the lengths of each side of the triangle. Protractor discs 67 cooperate with vernier plates 74 at each of the points $a$, $b$ and $c$ in order to indicate the angles A, B and C. Thus, the three units may be moved to assume any triangular configuration, in which event all of the angles and all of the side lengths will be directly displayed by the indicating means on the various plotters.

To demonstrate the standard trigonometric functions, the units 20' and 20" may be connected so that the angle C is a right angle, and, for the sake of convenience, the indicating scale 41 on the plotting unit 20 may be established in convenient units which are related to the graduations of the scales on the units 20' and 20" by a multiple or sub-multiple of ten. The reading on the graduated scale to measure the length $bc$ is, therefore, a direct measurement of the sine of the angle A, and the tape scale measurement on the unit 20' is a direct indication of the cosine of that angle. At the same time, of course, the reading on the unit 20' is a direct indication of the sine of the angle B, and the reading on the unit 20" measures the cosine of that angle. Other interesting measurements may be made by employing suitable scale graduations on indicating scale on the unit 20' which are related to the graduations of the scale on units 20 and 20" by a multiple or sub-multiple of 10, in which event the reading on the indicating means of the unit 20" is a direct indication of the tangent of the angle A, and the reading on the indicating scale of the unit 20 measures the secant of that angle. When the indicating scale on the unit 20' is thus calibrated the reading on the indicating scale of the unit 20" measures the cotangent of the angle A, and the reading on the indicating scale on the unit 20, which forms the hypotenuse of the triangle, measures the cosecant of that angle. In this manner all of the conventionally employed trigonometric indications may be read directly from the linear and angular scale indications on the three plotting units.

One of the more important first degree, first order geometric curves is a cardioid, the investigation of which is particularly useful in conjunction with the determination of mechanical movements embodied in gear teeth studies. Conventionally, these curves are produced by apparatus resembling that shown in Fig. 28, in which five arm linkages, respectively designated 20, 20$a$, 20$b$, 20$c$ and 20$d$, are rigidly interconnected in the manner shown. The tracer for producing the cardioid curve is located at the point $p$, and the rigidly interconnected units are pivoted about the points $f_1$ and $f_2$ so that the tracer transcribes a cardioid. The plotting units of the present invention may be connected in this manner, if desired, in which event the sliding assemblies of the units 20 and 20$c$ are pivoted respectively about the points $f_1$ and $f_2$. Both of the clamping means of the unit 20 are simultaneously actuated to lock the endless tape 22 of that unit and to prevent movement with respect to the fixedly positioned sliding assembly. Similarly, the two clamping means of the sliding assembly of the unit 20$c$ are simultaneously actuated to lock the endless tape of that unit.

By interconnecting the plotting units in this manner, each unit serves as a rigid linking arm with the other units and no advantage is taken of the unique mechanical cooperation between the slide, the wheel and the tape. However, by utilizing these mechanical features, it is possible to generate a cardioid using only three of the plotting units of the present invention by an assembly such as that shown in Fig. 27, in which the three units are connected wheel to wheel. Since the cardioid is defined as a curve produced by a point on a tracing circle rolling upon another circle, termed a rollover circle, when the two circles are of equal diameter, the curve may be generated by superimposing one unit 20 upon a second unit 20" and interconnecting the frames. One wheel assembly of the lower unit 20" is mounted on the drafting board so that the wheel assembly is held against rotation by a fixed positioning member located at the point $f_1$ of Fig. 27 while the frame of the unit 20" is rotatable about this point. The two sliding assemblies 24 and 24" of the units 20 and 20" are connected together and the wheel assembly of the upper unit is attached to the wheel assembly of the third plotting unit 20' at the point $c$ so that these wheel assemblies rotate together. Both of the clamping means 25$a'$ and 25$b'$ of the sliding assembly 24' are actuated, whereas one of the clamps on the sliding assembly of each of the units 20 and 20" is applied in order to provide for reverse movement of the tapes 22 and 22" as the units 20 and 20" are rotated about the point $f_1$. More particularly, the clamps 25$a$ and 25$b''$ may be simultaneously actuated, or, alternatively, the clamps 25$b$ and 25$a''$ may both be locked. As the unit 20" is moved about the point $f_1$, the endless tape 22" moves over the wheel assemblies and moves the sliding assembly 24" along the frame of the unit 20", Since the slide 24 is attached to the slide 24", the former is moved along the frame of the unit 20 and the endless tape 22 is moved therewith. Opposite sides of the endless tapes 22 and 22" are actuated, and, therefore, the tapes are moved in opposite directions and the wheel assemblies at the point $c$ are rotated oppositely. The wheel assembly of the unit 20' thus rotates in the same direction as the wheel assembly of the unit 20, and in an opposite direction to the rotation of the wheel assembly of the unit 20". Initially, the units 20, 20' and 20" occupy a position along the base line BL, as shown in Fig. 27, so that they are aligned, and the marker which is attached to the sliding assembly 24' is positioned at the point $p'$ on the base line. As the unit 20" rotates in a counterclockwise direction about the point $f_1$ as indicated by the arrow, the wheel assembly of the unit 20" at point $c$ rotates in a clockwise direction and the connected wheel assemblies of the units 20 and 20' at point c both rotate in a counterclockwise direction. Thus, the plotting unit 20' rotates about the point c in a counterclockwise direction also indicated by an arrow at a rate which is equal to the rotation of the unit 20''. If the clamps 25a' and 25b' are set so that the distance between point c and the slide 24' is equal to one-half of the length of the unit 20 or 20'', a cardioid curve is transcribed by the marker at the point p. The rollover circle in this case has a radius equal to one half the length of the plotter unit and the tracing circle, of course, has an equal radius. If the clamps 25a' and 25b' are set so that the distance from c to point p, is less than or greater than one-half of the length of one of the plotting units from $f_1$ to c, then a curve of the Limacon family, of which the cardioid is a special case, is produced.

When the plotting unit 20'' has rotated through 90° in a counterclockwise direction, the plotting unit 20' has rotated about the point c and moved in a counterclockwise direction through 90° and, thus, the two plotting units are at right angles to each other. By the time the plotting unit 20 has rotated through 180° in a counterclockwise direction, the plotting unit 20' has rotated in an opposite direction by 180°, and the two units are positioned side by side so that the point p is moved to a position nearest the point $f_1$ and one-half of the cardioid has been produced. The other half of the cardioid curve may be generated by moving the plotting unit 20 from the initial dotted line position along the base line in a clockwise direction in order to cause the marker to rotate about the point c in a clockwise direction as indicated above.

Although a detailed description for only a few of the curves which the plotter of the present invention is capable of producing have been described herein, it should be understood that numerous other curves may be generated. Geometric curves for any parametric family of equations which can be expressed as a first degree, first order differential function, may be demonstrated geometrically by the plotter. For instance, such curves as: cardioidal, cassinian, cessoidal, conical, circular, ellipsoidal, hyperbolic, parabolic, involute, evolute, hypocycloid with a predetermined number of cusps, conchoidal, limaconal, lemniscate of Bernoulli, limacon of Pascal, epitrochoidal, parallel curves, inversional curves, and catenarian, may be transcribed by selectively interconnecting the plotting units and by properly manipulating the clamping means on each of these units.

Furthermore, a number of units may be compounded to provide curve generations and interesting distortions which have not been heretofore achieved. As a simple example it can be seen that one of the units may be connected so that its sliding assembly follows a spiral configuration as described in detail in my concurrently filed application Serial No. 358,227, and the second plotting unit may be connected to the sliding assembly of the first so that the second unit also follows a spiral. In this manner a spiral may be generated, the center of which is moving as a spiral. Similarly, a circle may be generated from a center moving in a circle, in a spiral, or in a straight line. Many such curves and combinations of curves may be produced which are of academic interest or which may be useful in correlating geometrically known curves with mechanical movements. It should also be noted that even though most of the curves herein described have been of the two-dimensional type, the principles of operation of the plotter of the present invention are adaptable for three-dimensional curve generation.

It is to be understood that the foregoing description is pertinent only to a preferred embodiment of the invention to illustrate the principles thereof. Obviously, many modifications and variations of this invention are possible in the light of the above teachings. It is intended by the appended claims to cover all modifications and variations which fall within the true spirit and scope of the present invention.

What is claimed as new and desired to be secured by Letters Patent of the United States is:

1. A device for performing a variety of geometric functions comprising a plurality of interconnected arms each including a frame member, a slide mounted on the frame member of each arm and movable to any of a plurality of positions thereon, a plurality of fixedly positioned but spaced apart attaching means on each of said slides, a plurality of spaced apart attaching means on each frame member, means for selectively attaching said arm members together at different predetermined positions by interconnecting any selected one of the attaching means on one of said arms and any selected one of the attaching means on another of said arms, and means for simultaneously controlling the movement of the slides with respect to the frame members in response to movement of at least one of the arms.

2. A device for performing a variety of geometric functions comprising a plurality of interconnected arms each including a frame member, a slide mounted on each of the frame members and movable to any of a plurality of positions thereon, at least one rotatable member carried on each frame member, a plurality of spaced attaching means on each of said arms respectively carried on the frame member, the slide and the rotatable member, means for selectively attaching said arms together at different positions by interconnecting any one of the plurality of attaching means on one of said arms and any one of the attaching means on another of said arms, and means including a selectively operable clamping means on each arm for simultaneously controlling the rotation of said rotatable members, said clamping means being effective to permit free and unrelated movement of the slide and the frame member, to permit movement of the slide along its associated frame member in a predetermined direction and to prevent movement of the slide along its associated frame member in any direction.

3. A device for performing a variety of geometric functions comprising a plurality of separable arms each including a frame member, a slide mounted on each of the frame members and movable to any of a plurality of positions thereon, a plurality of spaced apart attaching pins on each of said arms, means including a detachable disc having pin receiving openings therein for selectively securing said arms together at different predetermined positions by interconnecting any one of the plurality of attaching pins on one of said arms and any one of the attaching pins on another of said arms, and means including said disc for simultaneously controlling the movement of said slides in response to a predetermined movement of said arms, said controlling means including an adjustable clamping means effective to permit free and unrelated movement of the slides on the arms, to permit movement of the slides along the arms in predetermined directions and to prevent movement of the slides along the arms in any direction.

4. A device for performing a variety of geometric functions comprising a plurality of separable arms each including a frame, a slide mounted on each frame and movable to any of a plurality of positions thereon, a plurality of attaching pins respectively carried on each arm, means including a detachable member having pin receiving openings therein for selectively securing said arms together at a plurality of different positions by interconnecting any selected one of the plurality of attaching pins on one of said arms and any selected one of the attaching pins on another of said arms, and means including the member for simultaneously controlling the movement of said slides with respect to said arms.

5. A device for performing a variety of geometric functions comprising a plurality of separable, interconnected arms, a slide mounted on each arm and movable to any of a plurality of positions thereon, a plurality of fixedly positioned but spaced apart attaching pins on each of said arms, means including a disc having openings therein accommodating said pins for selectively securing said arms together at a plurality of different positions by interconnecting any selected one of the plurality of the pins on one of said arms and any selected one of the pins on another of said arms, means for simultaneously controlling the movement of said slides in response to a predetermined movement of said arms, said controlling means including manually operable clamping means effective to permit free and unrelated movement of the slides so that the slides may be moved to any desired position along the arms, means for indicating the position to which the slide is moved, said clamping means also being effective to prevent movement of the slides along the arms and to permit movement of the slides in predetermined directions, and means for indicating the amount of movement of the slides in the predetermined directions.

6. A device for performing a plurality of geometric functions comprising a plurality of separable arms each including a frame, a pair of rotatable wheels mounted on each frame, an endless tape on each frame interconnecting the pair of wheels thereon, a slide mounted on each of said frame members, a plurality of adjustable clamping means on each of said slides for selectively clamping said slide to said endless tape so that the slide is moved along said frame in response to movement of the tape over the wheels; and means for interconnecting said arms in order to induce simultaneous movement of the wheels on the arms, the adjustable clamping means associated with each of the slides being selectively operable to permit free and unrelated movement between the slide and its associated tape when none of said clamping means is actuated, to induce movement of said slide along said frame when one of said clamping means is actuated, and to prevent movement of said slide along said frame when more than one of the clamping means are actuated.

7. A device for performing a plurality of geometric functions comprising a plurality of separable arms each including a frame, a pair of rotatable wheels mounted on each frame, an endless tape on each frame interconnecting the pair of wheels thereon, a slide mounted for sliding movement along each frame, a plurality of manually operable clamping means on each slide selectively operable to clamp the slide on each arm to the endless tape on that arm so that the slide is moved along said frame in accordance with the movement of the tape over the wheels, to lock the slide on each frame, or to permit movement of the slide independently of the tape, means interconnecting said arms for inducing simultaneous movement of the wheels on the arms, and means cooperating with the clamping means on the slide for controlling the movements of all of the slides with respect to their associated frames when at least one of the arms is moved.

8. A device for performing a plurality of geometric functions comprising a plurality of separable arms each including a frame, a pair of rotatable wheels mounted on each frame, an endless tape on each frame interconnecting the pair of wheels thereon and having first and second tape runs, a slide mounted for sliding movement along each frame, first and second manually operable clamping means on each slide for respectively clamping that slide to said first and second runs of its associated endless tape so that the slide is moved along said frame in response to the movement of the tape over the wheels when only one of the clamping means is operated, means interconnecting said frame members for inducing simultaneous movement of the wheels on said arms, and means cooperating with the clamping means on the slides for controlling the movements of all of the slides along their associated frames when at least one of the arms is moved, the clamping means on said slides, when both released, permitting free and unrelated movement of the slide on the endless tape associated therewith and, when both applied, preventing movement of the slide along its frame.

9. A device for performing a plurality of geometric functions comprising a plurality of separable arms each including a frame, a pair of rotatable wheels mounted on each frame, an endless tape on each frame interconnecting the pair of wheels thereon and having first and second tape runs, a slide mounted on each frame, first and second manually operable clamping means on each slide for respectively clamping the slide to the first and second runs of its associated endless tape so that the slide is moved along said frame in response to movement of the tape over the wheels when only one of the clamping means is operated, means interconnecting said arms for simultaneously moving the wheels on the arms, a graduated scale on each endless tape, an indicator on each slide in registry with the scale on its associated tape, and an indicator on each frame in registry with the graduated scale on the endless tape of that frame, said clamping means being effective when both are released to permit movement of the slide independently of the tape and when both are applied to prevent movement of the slide along its associated frame.

10. A device for performing a plurality of geometric functions comprising a plurality of separable arm members each including a frame, a pair of rotatable wheels mounted on each frame, an endless tape in the form of a single closed loop having parallel tape runs interconnecting the pair of wheels on each frame, a slide mounted on each frame, a plurality of manually operable clamping means on each slide respectively located adjacent the tape runs for selectively clamping said slide to said endless tape so that the slide is moved along said frame in response to movement of the tape over the wheels, and means interconnecting said arm members for producing simultaneous movement of the endless tapes on each of said frame members, the clamping means on each of said slides being selectively operable to release the clamping pressure on both of said tape runs to permit free and unrelated movement between the released slide and the endless tape associated therewith when all of said clamping means are released, said clamping means being operable to lock each of the sliding members at any predetermined position along its associated endless tape when more than one of said clamping means are operated thereby rendering the wheels ineffective to move with respect to the endless tape to which the sliding member is locked, said slide being moved along its associated frame by rotation of the wheels thereon when only one of the clamping means is operated.

11. A device for performing a variety of geometric functions which comprises a plurality of arm members each of which includes a frame, a pair of rotatable wheels on each of said frames, a slide mounted on said frame member, an endless tape interconnecting the pair of rotatable wheels on each of said arm members, selectively and manually operable clamping means on each slide for connecting the slide to the tape to control the movement of each slide along its frame, a first attaching means on said slidable member, a second attaching means positioned on one of said wheels, and a third attaching means positioned on the frame; and means for securing said arm members together by selectively interconnecting predetermined ones of the attaching means on each of the arm members; said clamping means and said securing means being effective to produce simultaneous movement of said endless tapes in predetermined directions.

12. A device for use with a marking means and a positioning device to perform a variety of geometric functions which comprises a plurality of arm members each of which includes a frame, a pair of rotatable wheels on each of said frames, a slide mounted on said frame, a flexible member interconnecting the pair of rotatable wheels on each of said arm members, a pair of spaced apart selectively operable clamping means on each slide for securing the slide to the flexible member in order to control the movement of the slide along its associated arm member, a first attaching means on said slide, a second attaching means on one of said wheels, a third attaching means on the other of said wheels, a fourth attaching means on the frame at a position adjacent said one wheel, and a fifth attaching means on the frame at a position adjacent said other wheel; means for securing said arm members together by selectively interconnecting predetermined ones of the attaching means on each of the arm members; means for selectively securing the positioning device to one of the attaching means; and means for selectively securing the marking means to another of said attaching means; said clamping means and said securing means being effective to produce predetermined relative movement between the indicator and the positioning device as the arm members are moved.

13. A device for performing a variety of geometric functions which comprises a plurality of arm members each of which includes a frame, a pair of rotatable wheels on each of said frames, a slide mounted on each frame, an endless tape in the form of a single closed loop having parallel tape runs interconnecting said rotatable wheels on each frame, a pair of selectively and manually operable clamps carried by each slide at positions respectively adjacent each tape run for controlling the movement of each slide along its frame; a plurality of fixedly positioned but spaced apart attaching means on each of said arm members, said attaching means being respectively disposed on said slide, on said frame and on one of the rotatable members; and means for selectively securing said arm members together at different predetermined positions by interconnecting different ones of the attaching means on each of the arm members; said clamping means and said securing means being effective to produce simultaneous movement of said endless tapes in predetermined directions.

14. A device for use with a marking means and a positioning device to perform a variety of geometric functions which comprises a plurality of arm members each of which includes a frame, a pair of rotatable wheels on each of said frames, a slide mounted on said frame, a flexible element interconnecting the rotatable wheels on each frame, selectively operable clamping means for securing the slide to the flexible element to control the movement of the slide along the frame, an attaching means on each of said frames, attaching means on each slide, and attaching means on each wheel; means for securing said arm members together by interconnecting preselected ones of the attaching means on each of the arm members, means for selectively securing the positioning device to one of the attaching means, and means for selectively securing the marking means to another of said attaching means, said clamping means and said securing means being operable to produce predetermined relative movement between the marking means and the positioning device as the arm members are moved.

15. A device for use with a marking means and a positioning device to perform a variety of geometric functions which comprises a plurality of arm members each of which includes a frame member, a pair of rotatable wheels on each of said frame members, a slidable member mounted on said frame member, means interconnecting the rotatable wheels and the slidable member for controlling the movement of the slidable member, a first attaching means on said slidable member, a second attaching means positioned on one of said wheels, a third attaching means positioned on the other of said wheels, a fourth attaching means positioned on the frame member adjacent said one wheel, a fifth attaching means on the frame member adjacent said other wheel; means for securing said arm members together at any one of a plurality of preselected positions by selectively interconnecting different ones of the attaching means on each of the arm members, means for selectively securing the positioning device to one of the attaching means, means for selectively securing the marking means to another of said attaching means, means including said controlling means for causing predetermined relative movement between the marking means and the positioning device as the arm members are moved, and means for continuously indicating the distance between the marking means and the positioning device.

16. A plotting device for use with a positioning member and a tracing means which comprises a plurality of arm members each of which includes a frame member, a pair of rotatable wheels on each of said frame members, an endless tape interconnecting said rotatable wheels and movable thereover, a slidable member mounted on said frame member, a plurality of clamping means for selectively clamping said sliding member to said tape at any desired position thereon so that the sliding member is moved along said frame in a predetermined direction when only one of said clamping means is operated and for locking said slidable member and said tape to prevent movement of the tape when more than one of the clamping means are operated, the slidable member being freely movable with respect to said tape when none of the clamping means is operated; a plurality of attaching means on each of said arm members; means for selectively attaching said arm members together by interconnecting one of the attaching means on each of the arm members; means for selectively attaching the positioning member to one of the attaching means on one of said arm members; means for selectively attaching the tracing means to another of the attaching means on one of the arm members, and means including the clamping means for controlling the movement of the slidable members of each of said arms to induce related movement of the endless tapes in predetermined directions so that the tracing means is moved relative to the positioning member in a preselected pattern.

17. A plotting device for use with a positioning member and a tracing means which comprises a plurality of arm members each of which includes a frame member, a pair of rotatable wheels on each of said frame members, an endless tape interconnecting said rotatable wheels and movable thereover, a slidable member mounted on said frame member, a plurality of clamping means for selectively clamping said sliding member to said tape at any desired position thereon so that the sliding member is moved along said frame in a predetermined direction when only one of said clamping means is operated and for locking said slidable member and said tape to prevent movement of the tape when more than one of the clamping means are operated, the slidable member being freely movable with respect to said tape when none of the clamping means is operated, a first attaching means on said slidable member, a second attaching means on the first of said wheels, and a third attaching means on the other of said wheels; means for selectively attaching said arm members together by interconnecting one of the attaching means on each of the arm members, means for selectively attaching the positioning member to one of the attaching means on one of said arm members; means for selectively attaching the tracing means to another of the attaching means on one of the arm members, and means including the clamping means for controlling the movement of the slidable members of each of said arms to induce related movement of the endless tapes in predetermined directions so that the tracing means is moved relative to the positioning member in a preselected pattern.

18. A plotting device for use with a positioning member and a tracing means which comprises a plurality of arm members each of which includes a frame member, a pair of rotatable wheels on each of said frame members, an endless tape interconnecting said rotatable wheels and movable thereover, a graduated scale on said endless tape, indicating means on said frame in registry with the scale on the endless tape to indicate the movement of the tape over the wheels, a slidable member mounted on said frame member, an indicator on said slidable member in registry with the graduated scale on the endless tape to indicate the position of said sliding member with respect to the tape, a plurality of clamping means for selectively clamping said sliding member to said tape at any desired position thereon so that the sliding member is moved along said frame in a predetermined direction when only one of said clamping means is operated and for locking said sliding member and said tape to prevent movement of the tape when more than one of the clamping means are operated, the slidable member being freely movable with respect to said tape when none of the clamping means is operated; a plurality of attaching means on each of said arm members; means for selectively attaching said arm members together by interconnecting one of the attaching means on each of the arm members; means for selectively attaching the positioning member to one of the attaching means on one of said arm members; means for selectively attaching the tracing means to another of the attaching means on one of the arm members; and means including the clamping means for controlling the movement of the slidable members of each of said arms to induce related movement of the endless tapes in predetermined directions so that the tracing means is moved relative to the positioning member in a preselected pattern.

19. A plotting device for use with a positioning member and a tracing means which comprises a plurality of arm members each of which includes a frame member, a pair of rotatable wheels on each of said frame members, an endless tape interconnecting said rotatable wheels and movable thereover, a graduated scale on said endless tape, indicating means on said frame in registry with the scale on the endless tape to indicate the movement of the tape over the wheels, a slidable member mounted on said frame member, a plurality of clamping means carried by said slidable member for selectively clamping said slidable member to said tape at any desired position thereon whereby the slidable member is moved along said frame in a predetermined direction when only one of said clamping means is operated and for locking said slidable member and said tape to prevent movement of the tape when more than one of the clamping means are operated, the slidable member being freely movable with respect to said tape when none of the clamping means is operated, a first attaching means on said slidable member, a second attaching means on the first of said wheels, and a third attaching means on the other of said wheels; means for selectively attaching said arm members together by interconnecting one of the attaching means on each of the arm members, means for selectively attaching the positioning member to one of the attaching means on one of said arm members; means for selectively attaching the tracing means to another of the attaching means on one of the arm members, and means including the clamping means for controlling the movement of the slidable members of each of said arms to induce related movement of the endless tapes in predetermined directions so that the tracing means is moved relative to the positioning member in a preselected pattern, the graduated scale of each of said endless tapes cooperating with the indicating means to provide a constant indication of the movement of said endless tapes.

20. A plotting device for use with a positioning member and a tracing means which comprises a plurality of arm members each of which includes a frame member, a pair of rotatable wheels on each of said frame members, an endless tape interconnecting said rotatable wheels and movable thereover, a graduated scale on said endless tape, indicating means on said frame in registry with the scale on the endless tape to indicate the movement of the tape over the wheels, a slidable member mounted on said frame member, a scale on said slidable member in registry with the graduated scale on the endless tape to indicate the position of said slidable member with respect to the tape, a plurality of clamping means for selectively clamping said slidable member to said tape at any desired position thereon so that the slidable member is moved along said frame in a predetermined direction when only one of said clamping means is operated and for locking said slidable member and said tape to prevent movement of the tape when more than one of the clamping means are operated; the slidable member being freely movable with respect to said tape when none of the clamping means is operated, a first attaching means on said slidable member, a second attaching means on the first of said wheels, and a third attaching means on the other of said wheels; means for selectively attaching said arm members together by interconnecting one of the attaching means on each of the arm members; means for selectively attaching the positioning member to one of the attaching means on one of said arm members; means for selectively attaching the tracing means to another of the attaching means on one of the arm members; means including the clamping means for controlling the movement of the slidable members of each of said arms to induce related movement of the slidable members in predetermined directions so that the tracing means is moved relative to the positioning member in a preselected pattern; the graduated scale readings of each of said endless tapes and the protractor readings providing a constant indication of the movement of said arm members, and an indicating scale on one of the wheel assemblies of one of the arm members in registry with the graduated scale of the endless tape of said one arm member.

21. In a device for producing conic section lines the combination of a pair of arm members each of which includes a rotatable member, means detachably interconnecting the rotatable members of each of said arm members for joint rotation, a slide on each of said arm members, means for maintaining the slides in fixed position, each of said arm members being manually movable along its fixedly positioned slide to a plurality of different positions to vary the distance between each slide and the interconnecting means, thereby to enable the device to produce different conic section lines, selectively operable means interconnecting the slide and the rotatable members of each arm member at each position of the slide for causing movement of the arm members upon the fixedly positioned slides when the joined rotatable members are moved so that the attached rotatable members follow a conic section line, and means for indicating directly the difference in the distance from the attached rotatable members and the slide on one of the arm members and the distance from the attached rotatable members to the slide on the other arm member as the arm members are manually moved to said different positions in order to indicate the curve constant for the different conic section lines produced.

22. In a device for producing conic section lines the combination of a pair of arm members each of which includes a rotatable member, a detachable member for attaching the rotatable members of each of said arms together, a marking means secured to the attached rotatable members, a fixed positioning assembly attached to each of said arm members so that each arm member is movable with respect to a fixed position, said arm members being manually movable to a plurality of different positions with respect to the positioning assemblies in order to vary the distance between each of the positioning assemblies and the attached rotatable members thereby to enable the device to produce different conic section lines, selectively operable means for causing the simultaneous movement of the arm members with respect to the fixed positioning assemblies when the arm members are at each of said positions so that the marking means traces a conic section line as the joined rotatable members are moved, and means for directly indicating the difference in the distance between the attached rotatable members and the fixed positioning assembly on one of the arm members and the distance between the attached rotatable members and the fixed positioning assembly on the other arm member when said arm members are manually moved between said different positions, thereby to indicate the curve constant for each conic section line produced.

23. In a device for producing conic section lines the combination of a pair of arm members each of which includes a rotatable member, means for detachably securing the rotatable members of each of said arms together, a marking means attached to the rotatable members, a positioning assembly mounted on each of said arm members so that each arm member is movable with respect to its associated positioning assembly, said rotatable members when detached permitting said arm members to occupy a number of different positions with respect to said positioning assemblies in order to effect the production of different conic section lines by said device, said detachable securing means being effective to join said rotatable members for joint rotation at each of said positions, selectively operable means for connecting each of said positioning assemblies to its associated arm member at each of said positions, means cooperating with the rotatable members and the positioning assemblies to form a constrained system in which the simultaneous movement of the arm members with respect to the positioning assemblies induces the marking means to trace a conic section line as the rotatable members are moved, indicating scales on each of said rotatable members, and an indicator in simultaneous registry with both of said indicating scales for measuring the differential rotation between said rotatable members when they are detached to permit manual movement of said arm members to said different positions, thereby to provide a continuous indication of the curve constant for the conic section line produced.

24. In a device for producing conic section lines the combination of a pair of arm members each of which includes a rotatable member, means for attaching the rotatable members of each of said arms together for simultaneous rotation, a marking means attached to the rotatable members, a fixed positioning member mounted on each of said arm members so that each arm member is movable with respect to a fixed position, selectively operable means for attaching said positioning member to the arm member at any of a plurality of positions thereon in order to enable the device to produce different conic section lines, means for indicating the position at which said positioning member is attached in order to measure the distance between each positioning member and the attached rotatable members, and means for measuring directly the difference between the distance from the marking means to one of the positioning members and the distance between the marking means and the other positioning member as the arm members are moved between said different positions, thereby to indicate the curve constant of each conic section line produced by said device.

25. In a device for producing conic section lines, the combination of a pair of separable arm members, a detachable member for securing said arm members together for pivotal movement with respect to each other, a fixed positioning assembly mounting each of said arm members whereby each arm member is movable with respect to its associated positioning assembly, selectively operable means operative in a first condition to secure each of said positioning assemblies to its associated arm member, said selectively operable means being operative to a second condition to permit manual movement of each arm member with respect to its associated positioning assembly to enable the device to produce conic section lines of different size, said selectively operable means being effective to cause movement of the arm members with respect to the positioning assemblies in predetermined directions when the selectively operable means is in the first condition in order to cause the detachable member to follow a particular conic section line, and means including a pair of indicators respectively carried on each of said arm members for directly indicating the difference between the distance from the detachable member to one of the positioning assemblies and the distance from the detachable member to the other positioning assembly as the arm members are manually moved with respect to said positioning assemblies when the selectively operable means is in said second condition, thereby to indicate the curve constant of the conic section lines.

26. In a device for producing conic section lines, the combination of a pair of arm members, a rotatable member on each arm member, means for detachably securing the rotatable member of said arms together, a fixed positioning means mounting each of said arm members whereby each arm member is movable with respect to its associated positioning means, selectively operable means for moving the arm members in predetermined directions upon movement of the joined rotatable members to cause the attached rotatable members to follow a conic section line, said selectively operable means and said detachable securing means being operable to permit relative rotation between the rotatable members and manual movement of said arm members with respect to said positioning means in order to enable the device to produce conic section lines of different size, a scale on each of said rotatable members, and means including an indicator in registry with both of said scales to indicate the differential rotation between said rotatable members when they are free for relative rotation, thereby to indicate the curve constant for the conic section line.

27. In a device for producing conic section lines, the combination of a pair of arm members, detachable means for pivotally joining said arm members together, a marking means attached at the junction of said arm members, a fixed positioning assembly mounting each of said arm members, means for constraining said arm members to induce predetermined movement of the arm members with respect to the positioning assemblies in order to move the marking means along a conic section line, said constraining means being selectively released to permit manual adjustment of the position of said arm members with respect to said positioning assemblies and means for directly displaying the difference between the distance from the marking means to one of said positioning assemblies and the distance from the marking means to the other of said positioning assemblies when the constraining means is released and the arm members are adjusted, thereby to indicate the curve constant for each conic section line produced.

28. In a device for producing conic section lines, the combination of a pair of arm members each of which includes a rotatable member, detachable means for pivotally joining said arm members together, a marking means attached at the junction of the arm members, a fixed positioning assembly mounting each of said arm members, means for constraining said arm members and said rotatable members to produce movement in predetermined directions of the arm members with respect to the positioning assemblies in order to move the marking means along a conic section line, said constraining means being releasable to permit adjustment of the position of each of said arm members with respect to said positioning assemblies, means for measuring the distances between the marking means and each positioning assembly, and means for directly displaying the difference between the distance from the marking means to one of said positioning assemblies and the distance from the marking means to the other of said positioning assemblies when the constraining means is released and the arm members are adjusted, thereby to provide a constant measurement of the curve constant for each conic section line produced.

29. In a device for producing conic section lines, the combination of a pair of arm members each of which includes a pair of rotatable members mounted at spaced positions thereon, and an endless tape interconnecting the rotatable members on each of the arm members; a fixedly positioned assembly mounting each of the arm members so that the arm member is movable with respect to the assembly; a manually operable clamping means on the positioning assembly of each of said arm members to enable the assembly to be clamped to said tape at any of a plurality of positions; and means for pivotally joining said arm members together in order to effect simultaneous rotation of the rotatable members by equal amounts, the rotation of the rotatable members inducing movement of the endless tape on each of said arm members to cause predetermined movement of the arm members with respect to the fixedly positioned assemblies thereby causing the junction of the arm members to follow a conic section line, said clamping means being releasable to permit movement of the arm members with respect to the positioning assemblies independently of the tape in order to produce different conic section lines.

30. In a device for producing conic section lines, the combination of a pair of arm members each of which includes a pair of rotatable members mounted at spaced positions thereon, an endless tape interconnecting the rotatable members on each of the arm members, and a sliding member mounted on each of the arm members, each sliding member including a manually operable clamp for securing the sliding member to the endless tape so that the arm member is movable with respect to the sliding member; a detachable member for joining one of the rotatable members on the first of said arms to one of the rotatable members on the second arm member in order to effect simultaneous rotation of the joined rotatable members by equal amounts; a marking means attached to the joined rotatable members; a first positioning means mounted on the sliding member of the first arm member and fixedly positioned at a first predetermined point; a second positioning means mounted on the sliding member of the second arm member and fixedly positioned at a second predetermined point; the rotation of the joined rotatable members inducing movement of the endless tape on each of said arm members to cause the arm members to move with respect to the fixedly positioned sliding members thereby causing the marking means to follow a conic section line.

31. In a device for producing conic section lines, the combination of a pair of arm members each of which includes a frame, a pair of rotatable members mounted at spaced positions on the frame, an endless tape having a graduated scale thereon interconnecting the rotatable members on each frame, a sliding member mounted on each frame and attached to the endless tape so that the frame is movable with respect to the sliding member, a first indicator on the frame in registry with the scale, and a second indicator on the slide in registry with the scale; means for joining one of the rotatable members on the first of said arm members to one of the rotatable members on the second arm member, thereby to effect simultaneous and equal rotation of the joined rotatable members; a first positioning means mounted on the sliding member of the first arm member and fixedly positioned at a first predetermined point, a second positioning means mounted on the sliding member of the second arm member and fixedly positioned at a second predetermined point, the rotation of the joined rotatable members inducing movement of the endless tape on each of said arm members in order to move the arm members with respect to the fixedly positioned sliding members thereby causing the joined rotatable members to follow a conic section line, the scale and said first and second indicators on each frame cooperating to provide indications of the curve parameters of the conic section line produced.

32. In a device for producing conic section lines, the combination of a pair of arm members each of which includes a pair of rotatable members mounted at spaced positions thereon, an endless tape interconnecting the rotatable members on each of the arm members and movable thereover, a fixedly positioned assembly mounting each of the arm members; means including a detachable member pivotally joining said arm members to effect simultaneous and equal movement of the endless tapes thereon, a marking means attached to the means joining the arm members so that said joined arm members may be moved about the positioning assemblies to move the marking means, means controlling the movement of the endless tape on each of said arm members, and means cooperating with the controlling means for inducing the marking means to follow a conic section line, means including a graduated scale on each of said endless tapes for providing a continuous measurement of the distances between the marking means and each positioning assembly, and means cooperating with both of the graduated scales to indicate a parameter of the conic section line.

33. In a device for producing conic section lines, the combination of a pair of separable arm members each of which includes a pair of rotatable members mounted at spaced positions thereon, an endless tape interconnecting the rotatable members on each of the arm members and movable thereover, a sliding member mounted on each of the arm members so that the arm member is movable with respect to the sliding member, a plurality of manually operable clamping means on each of said sliding members to enable the sliding member to be clamped to said tape, said clamping means being releasable to permit movement of the sliding member to any of a plurality of different positions along its arm member, a detachable member for joining one of the rotatable members on the first of said arm members to one of the rotatable members on the second of said arm members, thereby to effect simultaneous and equal rotation of the joined rotatable members, a marking means attached to the joined rotatable members, a first positioning means mounted on the sliding member of the first arm member and fixedly positioned at a first predetermined point, a second positioning means mounted on the sliding member of the second arm member and fixedly positioned at a second predetermined point, the rotation of the joined rotatable members inducing movement of the endless tape on each of the arm members to cause the arm members to move with respect to the fixedly positioned sliding members, thereby causing the marking means to follow a conic section line.

34. In a device for producing conic section lines, the combination of a pair of arm members, each of which includes a pair of rotatable members mounted at spaced positions thereon, an endless tape having a graduated scale thereon interconnecting the rotatable members on each of the arm members, a fixedly positioned assembly mounting each of the arm members, a plurality of manually operable clamping means on each of said assemblies whereby the assemblies may be selectively clamped to said tape at any of a plurality of positions, means for pivotally joining the arm members together to produce simultaneous and equal movement of the endless tapes, whereby the arm members are moved with respect to the fixedly positioned assemblies and the junction of the arm members traverses a conic section line, and an indicator cooperating with the graduated scales on both of the endless tapes to indicate a curve parameter for the conic section line.

35. In a device for producing conic section lines, the combination of a pair of separable arm members, each of which includes a frame, a pair of rotatable members mounted at spaced positions on each frame, an endless tape having a graduated scale thereon and having first and second tape runs interconnecting the rotatable members on each frame, a first indicator on each frame in registry with the scale of the tape on that frame, a sliding member mounted on each frame, a first and second manually operable clamping means on each of said sliding members at positions respectively adjacent the first and second tape runs, whereby the sliding member may be clamped to its associated tape at any of a plurality of positions by either of the clamping means, a second indicator on each sliding member cooperating with the scale on its associated tape to indicate the position on at which the sliding member is clamped, a first positioning means mounted on the sliding member of the first arm member and fixedly positioned at a first predetermined point, a second positioning means mounted on the sliding member of the second arm member and fixedly positioned at a second predetermined point, and means including a detachable disc for joining one of the rotatable members on each of said arm members together for simultaneous and equal rotation, marking means attached to the joined rotatable members, the rotation of the joined rotatable members inducing movement of the endless tape on each of said arm members in order to move the arm members with respect to the fixedly positioned sliding members, causing the marking means to follow a conic section line, said scales and indicators providing a continuous measurement of the distances from the marking means and each positioning means in order to indicate parameters of the conic section line.

36. In a device for producing conic section lines, the combination of a pair of separable arm members, each of which includes a pair of rotatable members mounted at spaced positions thereon, an endless tape interconnecting the rotatable members on each of the arm members, a sliding member mounted on each of the arm members so that the arm member is movable with respect to the sliding member, a plurality of manually operable clamping means on each of said sliding members for selectively securing the sliding member ot its associated tape at any of a plurality of different positions, means for indicating the position at which said sliding member is clamped, a first positioning means mounted on the sliding member of the first arm member and fixedly positioned at a first predetermined point, a second positioning means mounted on the sliding member of the second arm member and fixedly positioned at a second predetermined point, detachable means for joining one of the rotatable members on each of said arm members together for simultaneous and equal rotation, the rotation of the joined rotatable members inducing movement of the endless tapes of the two arm members in order to move the arm members with respect to the fixedly positioned sliding members thereby causing the marking means to follow a conic section line, and means on the arm members for measuring the distance between the joined rotatable members and each of the positioning means in order to determine the curve constants of the conic section line.

37. In a device for producing conic section lines, the combination of a pair of separable arm members each of which includes a frame, a pair of rotatable members mounted at spaced positions on the frame, an endless tape interconnecting the rotatable members on each frame, an indicating scale on each of said endless tapes, a first indicator on each frame in registry with the scale on the tape, a sliding member mounted on each of the arm members, a plurality of manually operable clamping means on each of said sliding members for securing the sliding member to its associated tape, a second indicator on said sliding member in registry with the scale on said tape to indicate the position at which the sliding member is clamped, a first positioning means mounted on a first of said arm members, and fixedly positioned at a first predetermined point, a second positioning means mounted on a second of said arm members and fixedly positioned at a second predetermined point, and detachable means for pivotally joining said arm members together to produce simultaneous and equal movement of their endless tapes, the rotation of the joined arm members inducing movement of the endless tape on each of the arm members in order to move the arm members with respect to the positioning means thereby causing the junction point of the arm members to follow a conic section line, said scales and indicators cooperating to provide measurements of the curve parameters of the conic section line.

38. In a device for producing conic section lines, the combination of a pair of arm members, each of which includes a frame, a pair of rotatable members mounted at spaced positions on the frame, an endless tape in the form of a single closed loop having parallel tape runs interconnecting the rotatable members on each frame, an indicating scale on each of said endless tapes, a first indicator on each frame in registry with the scale on the tape, a sliding member mounted on each frame, a pair of manually operable clamping means on each of said sliding members at positions respectively adjacent said tape runs, whereby each sliding member may be moved along its frame in response to rotation of the rotatable members and in a direction determined by selection of the clamping means to be actuated, a second indicator on said sliding member in registry with the scale on said tape to indicate the position at which the sliding member is clamped, a first positioning means mounted on the sliding member of the first arm member and fixedly positioned at a first predetermined point, a second positioning means mounted on the sliding member of the second arm member and fixedly positioned at a second predetermined point, detachable means for joining one of the rotatable members on each of said arm members together for simultaneous and equal rotation, the rotation of the joined rotatable members inducing movement of the endless tape on each of the arm members to move with respect to the fixedly positioned sliding members thereby causing the marking means to follow a conic section line, said clamping means and said detachable means being operable to permit adjustment of the arm members with respect to the sliding members to produce different conic section lines, and a third indicator in registry with the scales on both of the tapes to indicate the differential movement between said tapes resulting from said adjustment.

39. In a plotting device the combination of a pair of arm members each of which includes a rotatable member rotatably supported thereon, means pivotally interconnecting the rotatable members of said arm members and permitting relative rotation therebetween, means inducing simultaneous rotation of said rotatable members relative to one another as the arm members are moved in predetermined directions, and means for measuring the differential rotation between said rotatable members as the arm members are moved.

40. In a plotting device the combination of a pair of arm members each of which includes a rotatable member rotatably supported thereon, means for joining the rotatable member on one of said arm members to the rotatable member on the other arm member to permit pivotal movement between said arm members and to permit relative rotation between the joined rotatable members, a tracing means attached to the joined rotatable members, means for inducing relative rotation between the rotatable members as the arm members are moved in predetermined directions by movement of the tracing means, and means including graduated scales on each of said rotatable members for indicating the differential rotation of said rotatable members.

41. In a plotting device the combination of a pair of arm members each of which includes a rotatable member rotatably supported thereon, means for joining the rotatable member on one of said arm members to the rotatable member on the other arm member to permit pivotal movement between said arm members and to permit relative rotation between the joined rotatable members, a tracing means attached to the joined rotatable members, means for rotating the rotatable members simultaneously and relative to one another as the arm members are moved in predetermined directions by movement of the tracing means, a detachable graduated disc secured to each of said rotatable members, and an indicator in registry with both of the graduated discs to measure the differential rotation between said rotatable members.

42. In a plotting device the combination of a pair of arm members each of which includes a rotatable member rotatably supported thereon; a detachable member for joining the rotatable member on one of said arm members to the rotatable member on the other arm member to permit pivotal movement between said arm members and to permit relative rotation between the joined rotatable members; fixed positioning means supporting each of said arm members; a tracing means attached to the joined rotatable members; means including said detachable member for interconnecting said arm members, said rotatable members and said positioning means in order to rotate the rotatable members relative to one another and move the arm members along said positioning means in predetermined directions in response to movement of the tracing means; means including a pair of indicating scales respectively positioned on said rotatable means for measuring the differential rotation between said rotatable members; and means for continuously indicating the distance between each of said positioning means and the tracing means as the tracing means is moved.

43. In a plotting device the combination of a pair of arm members each of which includes a rotatable member rotatably supported thereon, means for joining the rotatable member on one of said arm members to the rotatable member in the other arm member to permit pivotal movement between said arm members and to permit relative rotation between the joined rotatable members, a tracing means attached to the joined rotatable members, means for rotating the rotatable members relative to one another as the arm members are moved in predetermined directions by movement of the tracing means, a detachable protractor scale on each of said rotatable members, an indicator on each of said arm members in registry with the protractor scale and another indicator supported by one of said arm members in registry with both of the protractor scales to indicate the differential rotation between said rotatable members as the tracing means follows the preselected pattern.

44. A device for producing hyperbolic lines which comprises a positioning member positioned at each of the foci of the hyperbola, an arm member attached to each of the positioning members and movable thereon, detachable means for pivotally joining said arm members together, means for moving the arm members upon the positioning members so that the distances between the detachable means and each of the positioning members are simultaneously decreased or simultaneously increased by equal amounts to cause the detachable means to follow a hyperbolic line, and means for directly indicating the difference between the distance from one of said positioning members to the detachable means and the distance from the other of said positioning members to the detachable means.

45. A device for producing hyperbolic lines which comprises a positioning member positioned at each of the foci of the hyperbola, an arm member supported by each of the positioning members and movable thereon, detachable means for pivotally joining said arm members together, means for moving the arm members upon the positioning members so that the distances between the detachable means and each of the positioning members are simultaneously decreased or simultaneously increased by equal amounts to cause the detachable means to follow a hyperbolic line, means for measuring the distance between each of the positioning members and the detachable means in order to measure the lengths of the generating radii for the hyperbolic curve, and means for measuring directly the difference between the lengths of the generating radii in order to determine the curve constant for the hyperbola produced.

46. A device for producing hyperbolic lines which comprises a positioning member positioned at each of the foci of the hyperbola, an arm member attached to each of the positioning members and movable thereon, detachable means for pivotally joining said arm members together, marking means positioned at the junction of the arm members, means for moving the arm members upon the positioning members so that the distances between the marking means and each of the positioning members are simultaneously decreased or simultaneously increased by equal amounts to cause the marking means to trace a hyperbolic line, means for adjusting the position at which each of said arm members is attached to its associated positioning member thereby enabling the device to produce a family of hyperbolas having common foci, and means providing a direct measurement of the difference between the distance from one of said positioning members to the marking means and the distance from the other end of said positioning members to the marking means in order to indicate the curve constant for each of the hyperbolas produced by adjustment of the arm members.

47. A device for producing hyperbolic lines which comprises a positioning member positioned at each of the foci of the hyperbola, an arm member attached to each of the positioning members and movable thereon, means for pivotally joining said arm members together, marking means positioned at the junction of the arm members, means for moving the arm members upon the positioning members so that the distances between the marking means and each of the positioning members are simultaneously decreased or simultaneously increased by equal amounts to cause the marking means to trace a hyperbolic line, means for adjusting the position at which each of said arm members is attached to its associated positioning member thereby enabling the device to produce a family of hyperbolas having common foci, means for measuring the distance between each of the positioning members and the marking means in order to measure the lengths of the generating radii for each of the hyperbolic curves produced, and means for directly measuring the difference between the lengths of the generating radii for all of the hyperbolic curves in order to measure the curve constant for each hyperbola.

48. A device for producing hyperbolic lines which comprises first and second positioning members respectively positioned at the foci of the hyperbola, a pair of separable arms each of which includes a pair of rotatable wheels disposed at spaced positions thereon, an endless tape interconnecting the wheels on each arm and movable thereover, a slide detachably secured to the tape on each of said arms and movable with respect to the arms, a first detachable member for attaching said first positioning member to the slide on a first of said arms, a second detachable member for attaching the second positioning member to the slide on the second arm, a third detachable member for joining one of the wheels on the first arm and one of the wheels on the second arm for simultaneous rotation whereby rotation of the joined wheels moves the tapes on each of said arms, and a marking means attached to the joined rotatable members, the movement of said tapes inducing movement of the arms with respect to said slides thereby causing the distance between the marking means and each of the positioning members to be simultaneously increased or decreased by equal amounts upon rotation of the rotatable members whereby the marking means traces a hyperbola.

49. A device for producing hyperbolic lines which comprises, first and second positioning members respectively positioned at the foci of the hyperbolic lines, a pair of separable arms each of which includes a pair of wheels mounted at spaced positions thereon, an endless tape interconnecting the wheels on each arm member and having first and second tape runs, a slide on each arm, first and second manually operable clamping means on each slide for respectively securing the slide to the first and second runs of its associated tape, means for attaching said first positioning member to the slide on a first of said arms, means for attaching said second positioning member to the slide on a second of said arms, a detachable disc in engagement with one of the wheels on the first arm and with one of the wheels on the second arm to produce joint rotation thereof, a marking means attached to the joined wheels, the simultaneous rotation of the joined wheels causing the arm members to move in order that the distances between the marking means and each of the positioning members are simultaneously altered by equal amounts whereby the marking means traces a hyperbola.

50. A device for producing hyperbolic lines which comprises a positioning member positioned at each of the foci of the hyperbola, a pair of arm members each of which includes a pair of spaced rotatable members, an endless tape having a graduated scale thereon interconnecting the rotatable members on each arm member and movable thereover, a sliding member on each of said arm members and movable thereon, means securing a first of said positioning members to the sliding member on a first of said arm members, means securing a second of said positioning members to the sliding member on the second arm member, a pair of manually operable clamping means on each of said sliding members for clamping the sliding member to its associated tape at said selected positions in order to cause relative movement between the sliding member and the arm member as the tape is moved over the rotatable member, the clamping means on each sliding member when both released permitting movement of the sliding member to any selected position along its associated arm member independently of the tape in order to permit the device to generate different hyperbolas, means for joining one of the rotatable members on the first arm member and one of the rotatable members on the second arm member for simultaneous rotation after the sliding members have been clamped at said selected positions, an indicator on each slide cooperating with the graduated scale to indicate the distance between each slide and the joined rotatable members, and a marking means attached to the joined rotatable members, the joint rotation of said rotatable members inducing movement of the arm members by equal amounts in order to cause the distance between the marking means and each of the positioning members to be simultaneously increased or simultaneously decreased upon rotation of the rotatable members whereby the marking means traces a hyperbola.

51. A device for producing a hyperbolic lines which comprises a positioning member positioned at each of the foci of the hyperbola, a pair of arm members each of which includes a pair of rotatable members at spaced positions thereon, an endless tape interconnecting the rotatable member on each arm member and movable thereover, means for measuring the movement of the tape over the rotatable members, a sliding member on each of said arm members and movable thereon, attaching pins on each of said rotatable members and on each sliding member, a first perforated disc for attaching a first of said positioning members to the pin on the sliding member of a first of said arm members, a second perforated disc for attaching a second of said positioning members to the pin on the sliding member of the second arm member, the sliding members on each of said arm members being manually movable to any of a plurality of selected positions therealong in order to permit the device to generate different hyperbolas, a pair of manually operable clamping means on each of said sliding members for clamping the sliding member to the tape at said selected positions to cause relative movement between the sliding member and the arm member as the tape is moved over the rotatable member, means for indicating the selected position along said tape at which each of the sliding members is clamped, a third perforated disc for joining the pin on one of the rotatable members of the first arm member and the pin on one of the rotatable members of the second arm member for simultaneous rotation after the sliding members have been clamped to their associated tapes, and a marking means attached to the joined rotatable members, the joint rotation of said rotatable members inducing movement of the arm members by equal amounts with respect to their associated sliding members in order to cause the distance between the marking means and each of the positioning members to be simultaneously increased or simultaneously decreased upon rotation of the rotatable members whereby the marking mean traces a hyperbola.

52. A plotting device comprising a plurality of arm members each of which includes a frame member, a pair of rotatable wheels on each of said frame members, an endless tape interconnecting said rotatable wheels and movable thereover, a slidable member mounted on said frame member, a plurality of clamping means for selectively clamping said sliding member to said tape at any desired position thereon so that the sliding member is moved along said frame in a predetermined direction when only one of said clamping means is operated and for locking said slidable member and said tape to prevent movement of the tape when more than one of the clamping means are operated, the slidable member being freely movable with respect to said tape when none of the clamping means is operated; a plurality of spaced apart attaching means on each of said arm members at least one of which is located on said slidable member and another of which is located on one of the rotatable members; means for selectively and detachably attaching said arm members together by interconnecting one of the attaching means on each of the arm members; and means including the clamping means for controlling the movement of the slidable members of each of said arms to induce related movement of the endless tapes in predetermined directions.

53. A plotting device comprising a plurality of arm members each of which includes a frame member, a pair of rotatable wheels on each of said frame members, an endless tape interconnecting said rotatable wheels and movable thereover, a slidable member mounted on said frame member, a plurality of clamping means for selectively clamping said sliding member to said tape at any desired position thereon so that the sliding member is moved along said frame in a predetermined direction when only one of said clamping means is operated and for locking said slidable member and said tape to prevent movement of the tape when more than one of the clamping means are operated, the slidable member being freely movable with respect to said tape when none of the clamping means is operated, a first attaching means on said slidable member, a second attaching means on the first of said wheels, and a third attaching means on said frame member; means for selectively attaching said arm members together by interconnecting one of the attaching means on each of the arm members, means for selectively attaching the positioning member to one of the attaching means on one of said arm members; means for selectively attaching the tracing means to another of the attaching means on one of the arm members; and means including the clamping means for controlling the movement of the slidable members of each of said arm members to induce related movement of the endless tapes.

54. A plotting device comprising a plurality of arm members each of which includes a frame member, a pair of rotatable wheels on each of said frame members, an endless tape interconnecting said rotatable wheels and movable thereover, a graduated scale on said endless tape, indicating means on said frame in registry with the scale on the endless tape to indicate the movement of the tape over the wheels, a slidable member mounted on said frame member, an indicator on said slidable member in registry with the graduated scale on the endless tape to indicate the position of said sliding member with respect to the tape, a plurality of clamping means for selectively clamping said sliding member to said tape at any desired position thereon so that the sliding member is moved along said frame in a predetermined direction when only one of said clamping means is operated and for locking said sliding member and said tape to prevent movement of the tape when more than one of the clamping means are operated, the slidable member being freely movable with respect to said tape when none of the clamping means is operated; a plurality of attaching means on each of said arm members; means for selectively attaching said arm members together by interconnecting one of the attaching means on each of the arm members; and means including the clamping means for controlling the movement of the slidable members of each of said arms to induce related movement of the endless tapes in predetermined directions.

55. A plotting device comprising a plurality of arm members each of which includes a frame member, a pair of rotatable wheels on each of said frame members, an endless tape interconnecting said rotatable wheels and movable thereover, a slidable member mounted on said frame member, a plurality of clamping means carried by said slidable member for selectively clamping said slidable member to said tape at any desired position thereon whereby the slidable member is moved along said frame in a predetermined direction when only one of said clamping means is operated and for locking said slidable member and said tape to prevent movement of the tape when more than one of the clamping means are operated, the slidable member being freely movable with respect to said tape when none of the clamping means is operated, a first attaching means on said slidable member, a second attaching means on the first of said wheels, a third attaching means on the other of said wheels, and fourth and fifth attaching means on said frame; means for selectively attaching said arm members together by interconnecting one of the attaching means on each of the arm members; and means including the clamping means for controlling the movement of the slidable members of each of said arms to induce related movement of the endless tapes in predetermined directions.

56. A plotting device comprising a plurality of arm members each of which includes a frame member, a pair of rotatable wheels on each of said frame members, an endless tape interconnecting said rotatable wheels and movable thereover, a graduated scale on said endless tape, indicating means on said frame in registry with the scale on the endless tape to indicate the movement of the tape over the wheels, a slidable member mounted on said frame member, a scale on said slidable member in registry with the graduated scale on the endless tape to indicate the position of said slidable member with respect to the tape, a plurality of clamping means for selectively clamping said slidable member to said tape at any desired position thereon so that the slidable member is moved along said frame in a predetermined direction when only one of said clamping means is operated and for locking said slidable member and said tape to prevent movement of the tape when more than one of the clamping means are operated, the slidable member being freely movable with respect to said tape when none of the clamping means is operated, a first attaching means on said slidable member, a second attaching means on the first of said wheels, a third attaching means on the other of said wheels, and fourth and fifth attaching means on said frame at positions respectively adjacent said rotatable members; means for selectively attaching said arm members together by interconnecting one of the attaching means on each of the arm members; means including the clamping means for controlling the movement of the slidable members of each of said arms to induce related movement of the endless tapes in predetermined directions, and an indicating scale on one of the wheel assemblies of one of the arm members in registry with the graduated scale of the endless tape of said one arm member.

References Cited in the file of this patent

UNITED STATES PATENTS

| | | |
|---|---|---|
| 21,041 | Wythe | July 27, 1858 |
| 841,223 | Brenner | Jan. 15, 1907 |
| 864,455 | Degen | Aug. 27, 1907 |
| 1,684,887 | Ridgeway | Sept. 18, 1928 |
| 2,164,216 | Little | June 27, 1939 |
| 2,422,025 | Luck | June 10, 1947 |
| 2,480,914 | Gallington et al. | Sept. 6, 1949 |
| 2,493,786 | Swift | Jan. 10, 1950 |
| 2,513,641 | Gray | July 4, 1950 |
| 2,587,467 | Hawkins et al. | Feb. 26, 1952 |

FOREIGN PATENTS

| | | |
|---|---|---|
| 366,024 | France | July 17, 1906 |
| 94,040 | Switzerland | May 1, 1919 |
| 342,893 | Great Britain | Feb. 12, 1931 |
| 770,759 | France | July 9, 1934 |